(12) United States Patent
Hasek

(10) Patent No.: US 7,941,823 B2
(45) Date of Patent: May 10, 2011

(54) TRANSPORT STREAM ENCAPSULATED TRICK MODES

(75) Inventor: Charles Hasek, Broomfield, CO (US)

(73) Assignee: Time Warner Cable Inc., New York, NY (US)

( * ) Notice: Subject to any disclaimer, the term of this patent is extended or adjusted under 35 U.S.C. 154(b) by 712 days.

(21) Appl. No.: 11/735,772

(22) Filed: Apr. 16, 2007

(65) Prior Publication Data

US 2008/0253406 A1    Oct. 16, 2008

(51) Int. Cl.
*H04N 7/173* (2011.01)
(52) U.S. Cl. ................. 725/88; 725/90; 725/93
(58) Field of Classification Search .......... 725/88
See application file for complete search history.

(56) References Cited

U.S. PATENT DOCUMENTS

| | | | |
|---|---|---|---|
| 6,442,332 | B1 | 8/2002 | Knudson et al. |
| 7,024,678 | B2 * | 4/2006 | Gordon et al. .......... 725/88 |
| 7,073,189 | B2 | 7/2006 | McElhatten et al. |
| 2003/0056217 | A1 | 3/2003 | Brooks |
| 2003/0185543 | A1 | 10/2003 | Gunatilake |
| 2004/0003403 | A1 * | 1/2004 | Marsh ................. 725/53 |
| 2004/0093618 | A1 * | 5/2004 | Baldwin et al. ......... 725/101 |
| 2005/0034171 | A1 | 2/2005 | Benya |
| 2005/0135783 | A1 | 6/2005 | Crinon |
| 2005/0191031 | A1 | 9/2005 | Lee |
| 2006/0013557 | A1 | 1/2006 | Poslinski |
| 2006/0085816 | A1 | 4/2006 | Funk et al. |
| 2006/0171659 | A1 | 8/2006 | Worrell et al. |
| 2006/0277581 | A1 * | 12/2006 | Eliyahu et al. ........ 725/88 |
| 2008/0120637 | A1 * | 5/2008 | Deiss ................... 725/32 |

FOREIGN PATENT DOCUMENTS

WO    WO 2006/050223    5/2006

OTHER PUBLICATIONS

U. S. Appl. No. 11/673,875, filed Feb. 12, 2007 titled "Prevention of Trick Modes During Digital Video Recorder (DVR) and Network Digital Video Recorder (NDVR) Content" of Charles Hasek.

* cited by examiner

*Primary Examiner* — John W Miller
*Assistant Examiner* — Chris Parry
(74) *Attorney, Agent, or Firm* — Otterstedt, Ellenbogen & Kammer, LLP

(57) ABSTRACT

A representation of an audiovisual asset is obtained and is processed to obtain at least one normal playback video elementary stream, (optionally, at least one audio elementary stream), and at least one trick mode video elementary stream. A transport stream is formed from the at least one normal playback video elementary stream, the at least one audio elementary stream (where present), and the at least one trick mode video elementary stream, with the at least one trick mode video elementary stream encapsulated in the transport stream. Streaming of the transport stream within a network is facilitated, for example, to a VOD server (for de-encapsulation), and in some approaches, to a set-top box.

44 Claims, 11 Drawing Sheets

100

300

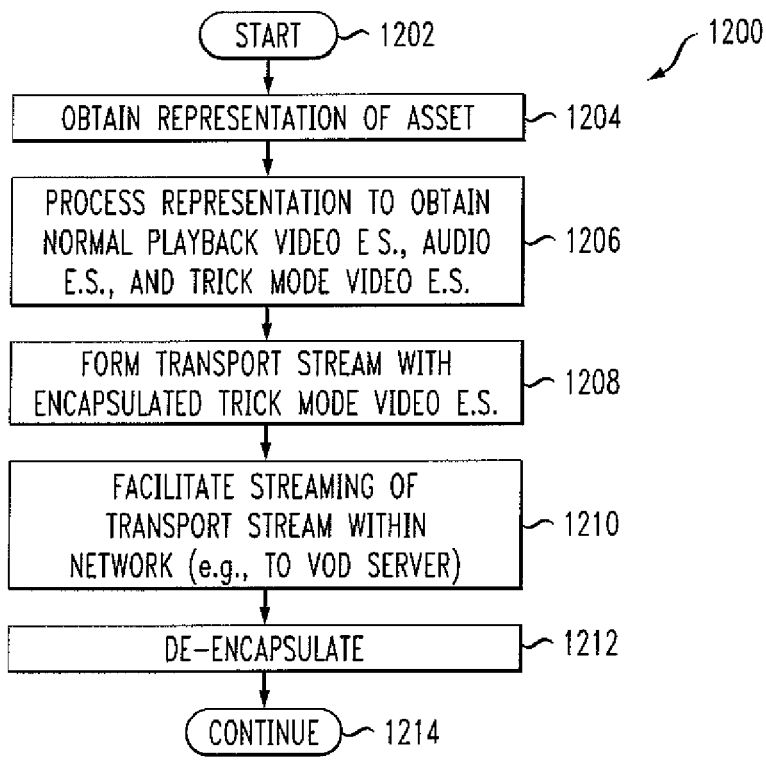
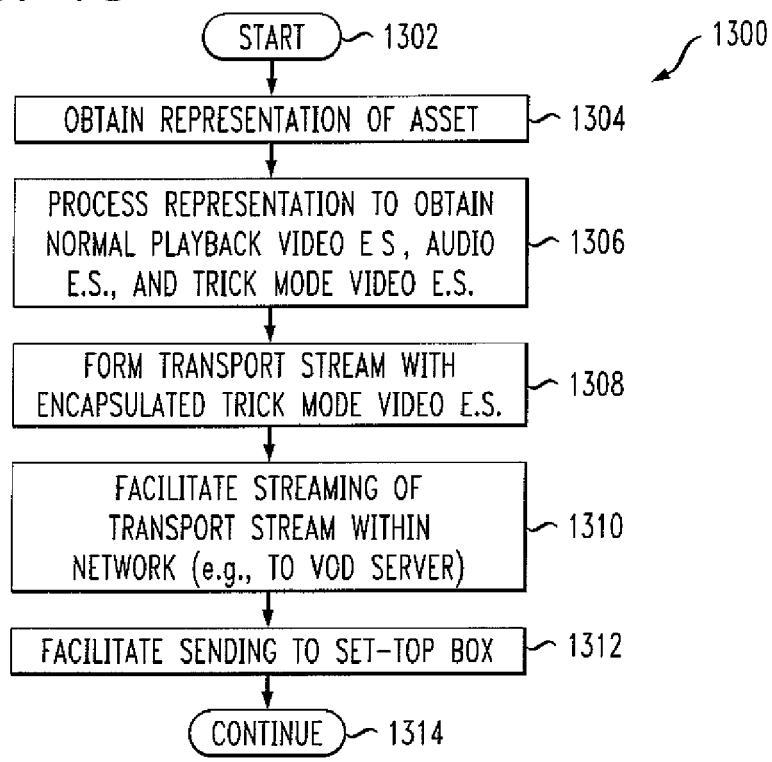

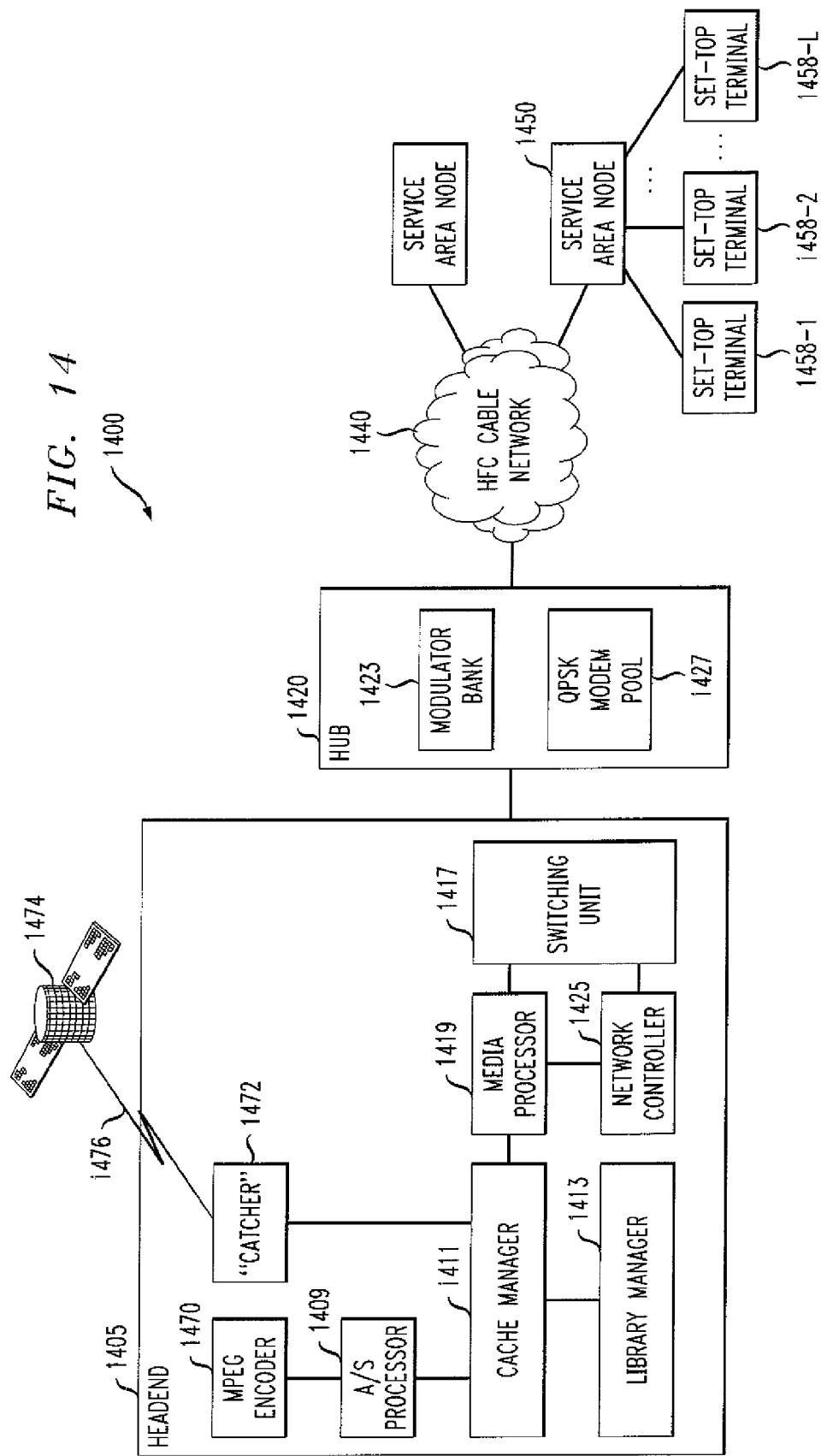

TRANSPORT STREAM ENCAPSULATED TRICK MODES

FIELD OF THE INVENTION

The present invention relates generally to communications systems and methods, and, more particularly, to techniques for delivering content through a communications network such as, for example, a cable television network, a cellular network, a Transmission Control Protocol/Internet Protocol (TCP/IP) network, a DOCSIS® (Data Over Cable Service Interface Specification) network (registered mark of Cable Television Laboratories, Inc, 400 Centennial Parkway Louisville Colo. 80027, USA), and the like.

BACKGROUND OF THE INVENTION

With the advent of digital communications technology, many TV program streams are transmitted in digital formats. For example, Digital Satellite System (DSS), Digital Broadcast Services (DBS), and Advanced Television Standards Committee (ATSC) program streams are digitally formatted pursuant to the well known Moving Pictures Experts Group 2 (MPEG-2) standard. The MPEG-2 standard specifies, among other things, the methodologies for video and audio data compression allowing for multiple programs, with different video and audio feeds, to be multiplexed in a transport stream traversing a single transmission channel. A digital TV receiver may be used to decode an MPEG-2 encoded transport stream, and extract the desired program therefrom.

In accordance with the MPEG-2 standard, video data may be compressed based on a sequence of groups of pictures (GOPs), made up of three types of picture frames, namely, intra-coded picture frames ("I-frames"), forward predictive frames ("P-frames"), and bilinear frames ("B-frames"). Each GOP may, for example, begin with an I-frame which is obtained by spatially compressing a complete picture using discrete cosine transformation (DCT). As a result, if a transmission error or a channel switch occurs, it is possible to resume correct decoding at the next I-frame. The GOP may represent additional frames by providing a much smaller block of digital data that indicates how small portions of the I-frame, referred to as macroblocks, move over time.

An I-frame is typically followed by multiple P- and B-frames in a GOP Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame. A B-frame compares both the preceding and the subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, allowing the representation of these additional frames to be quite compact. Although GOPs have no relationship between themselves, the frames within a GOP have a specific relationship which builds off the initial I-frame.

The compressed video and audio data are typically carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption), and this information (i.e., whether open or subject to conditional access) is also carried in the MPEG-2 transport stream, typically as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

The well-known H 264/MPEG-4/AVC (Advanced Video Coding) standard is noted for achieving very high data compression and employs basic principles similar to those of MPEG-2, with a number of features that are enhanced, compared to MPEG-2, as will be familiar to the skilled artisan.

Use of digital video recorders (DVRs), also known as personal video recorders (PVRs), such as the TiVo® device (registered mark of TiVo Brands LLC, Alviso, Calif.) and the R Replay TiVo® device (registered mark of Digital Networks North America Inc, Pine Brook, N.J.), is ubiquitous Such devices may provide some benefits to TV viewers. For example, a prior art DVR allows a user to record his or her favorite TV programs for later review, and to exercise a season-pass-like option wherein every episode of his or her favorite program is recorded for some period. Such devices may automatically record programs for the user based on his or her viewing habits and preferences. The presentation of the recorded programming content can be manipulated by exercising rewind, pause, skip and/or fast-forward functions (hereinafter referred to as "trick mode" functions) furnished by the DVR U.S. Pat. No. 7,073,189 of McElhatten, et al. is entitled "Program guide and reservation system for network based digital information and entertainment storage and delivery system." The disclosure of the aforesaid U.S. Pat. No. 7,073,189 of McElhatten, et al. is expressly incorporated herein by reference for all purposes A "network PVR (NPVR)" (also referred to as an NDVR (Network Digital Video Recorder)) service allows the user to perform the analogous DVR functions through use of a network, rather than via a local DVR at the user premises. Unlike a DVR device, the NPVR service allows a user to "reserve" past and future programs for his or her review, even if such reserved programs were not identified by the user before their broadcast.

Note that "trick modes" or "trick play" refer to one or more of fast forward, reverse, pause, skip, and the like.

In typical current video-on-demand (VOD) and NDVR systems, trick modes are handled by creating trick mode files as separate files stored within the system. Current techniques may place an undesirable synchronization burden on other system components. Furthermore, current techniques may place an additional burden on propagation due to having to propagate normal video and trick mode file(s) and/or stream(s).

U.S. Patent Application Publication 2005-0135783 of Regis J. Crinon is entitled "Trick mode elementary stream and receiver system." A video receiver system comprises a video elementary stream decoder that decodes an elementary stream and one or more trick mode processing modules that modify the elementary stream to enable a trick mode effect The trick mode processing module(s) produce a trick mode elementary stream for input to the video elementary stream decoder module. For example, the one or more trick mode processing modules can replace plural non-key frames of the elementary stream with one or more P-type skipped frames for a fast forward effect, where the trick mode elementary stream comprises one or more entry point key frames and the one or more P-type skipped frames. The video receiver system can selectively route the elementary stream to either the video elementary stream decoder module or the one or more trick mode processing modules. The system set forth in the Crinon reference thus seeks to implement trick modes on the decoder side Further improvements on known techniques would be desirable.

SUMMARY OF THE INVENTION

Principles of the present invention provide techniques for transport stream encapsulated trick modes. In one aspect, an exemplary method (which can be computer implemented) is provided for propagating an audiovisual asset. The method includes the steps of obtaining a representation of the audiovisual asset, and processing the representation to obtain at least one normal playback video elementary stream and at least one trick mode video elementary stream. The method further includes the step of forming a transport stream from the at least one normal playback video elementary stream and the at least one trick mode video elementary stream, with the at least one trick mode video elementary stream being encapsulated in the transport stream. The method still further includes the step of facilitating streaming of the transport stream within a network.

In another aspect, an advantageous method of providing trick modes in a video-on-demand system includes the steps of obtaining a representation of an audiovisual asset, processing the representation to obtain at least one normal playback video elementary stream and at least one trick mode video elementary stream, forming a transport stream from the at least one normal playback video elementary stream and the at least one trick mode video elementary stream, the at least one trick mode video elementary stream being encapsulated in the transport stream, streaming the transport stream within a network, and providing the trick modes based on the at least one trick mode video elementary stream encapsulated in the transport stream.

As used herein, "facilitating" an action includes performing the action, making the action easier, helping to carry the action out, or causing the action to be performed.

An exemplary embodiment of an apparatus, according to yet another aspect of the invention, can include a memory and at least one processor coupled to the memory. The processor can be operative to facilitate performance of one or more of the method steps described herein. In still another aspect, the apparatus can comprise means for performing the various method steps. The means can include one or more hardware modules, one or more software modules, or a mixture of one or more software modules and one or more hardware modules.

One or more method steps of the present invention can be implemented in the form of an article of manufacture comprising a machine readable medium that contains one or more programs which when executed implement such step(s).

Techniques of the present invention can provide substantial beneficial technical effects. For example, one or more inventive embodiments provide one or more of the following: reduced processing overhead on network devices, such as the VOD server, set top box, and the like; and easier content propagation and transport.

These and other features and advantages of the present invention will become apparent from the following detailed description of illustrative embodiments thereof, which is to be read in connection with the accompanying drawings.

BRIEF DESCRIPTION OF THE DRAWINGS

FIG. 12 is a flow chart of a preferred embodiment of an inventive method of propagating an audiovisual asset, in accordance with an aspect of the invention;

FIG. 13 is a flow chart of an alternative embodiment of an inventive method of propagating an audiovisual asset, in accordance with another aspect of the invention;

FIG. 14 is a block diagram generally similar to FIG. 1, showing certain aspects of inventive head end functionality.

DETAILED DESCRIPTION OF PREFERRED EMBODIMENTS

Figure 1:
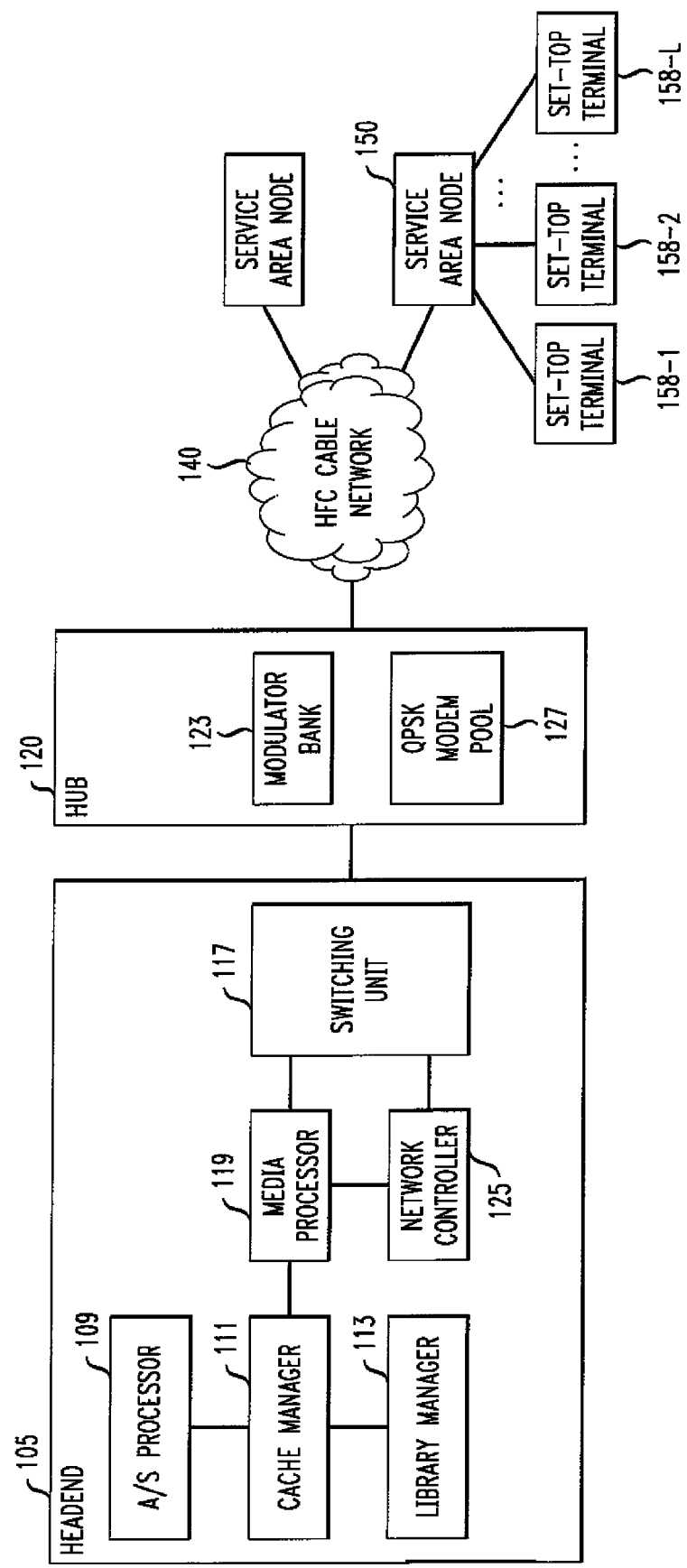
FIG. 1 is a block diagram of a broadband communications system in accordance with the invention.

One or more inventive embodiments may be implemented, by way of example, and not limitation, within the context of delivering programming content to users though a broadband communications network, such as a cable TV network. Selected programs or program channels may be afforded a network personal video recorder (NPVR) service to enhance a user's enjoyment of programming content. In accordance with the NPVR service, broadcast programs (or at least those broadcast programs afforded the NPVR service) are recorded at a head-end of a cable network when they are delivered to a user at a set-top terminal. Thus, the user not only may "reserve" for review a future program and a previously broadcast program, but may also restart an in-progress program, since such program has been recorded at the head-end regardless of any user request. That is, the NPVR service obviates the need for the proactive effort otherwise required of a typical DVR user, which includes deciding and actively electing in advance what shows to record. In addition, the NPVR service furnishes tick mode functions for manipulating a presentation of recorded programming content.

U.S. Patent Application Publication 2005-0034171, kind code A1, of Robert Benya, published Feb. 10, 2005, entitled "Technique for delivering programming content based on a modified network personal video recorder service," is expressly incorporated herein by reference for all purposes, and discloses a non-limiting example of a network that can be modified to implement one or more inventive techniques.

Network broadcasting service companies (NBSCs), for example, Columbia Broadcasting System (CBS), American Broadcasting Company (ABC), and the like may have various concerns in connection with DVR or NDVR systems. The revenue income of such NBSCs is principally derived from commercials interspersed with the programming. As is well known, a TV show is typically interrupted by commercial breaks during which commercials are played An NBSC sells commercial time slots to advertisers for the purpose of placing commercials therein The price of a commercial time slot varies with the anticipated size of the audience of the associated TV show, stemming from the assumption that the same audience would watch both the show and the commercial placed in such a time slot. That is, the more popular the show is, the more expensive the commercial time slots associated with the show Recently, product placement advertisements have become common, in which advertisers pay to place a commercial product on a show. For example, a product placement advertisement may involve an actor drinking from a beverage can on a TV show, with the manufacturer's logo shown, thereby advertising the beverage. The price for one such product placement advertisement varies with the popularity of the show associated therewith.

The majority of the population watches TV between 8:00 pm and 11:00 pm on weeknights, that is, after dinner and before bedtime, a time period also known as "prime time." To vie for a large share of TV viewers, NBSCs typically line up popular shows for display during the TV prime time, also known as a prime time lineup A DVR or NDVR service may adversely affect NBSCs' return on their investment in a prime time lineup, which normally calls for a large budget to produce, inasmuch as the NPVR service removes the traditional broadcast schedule constraint, and allows the user to view the program at a time of his or her choice. Thus, an NPVR user can view programs, which are nominally in a prime time lineup, not necessarily during the TV prime time. The cumulative effect is that even if the programs in a prime time lineup are popular, there is no guarantee of a large audience during the TV prime time. As a result, advertisers may be unwilling to pay a premium for commercial time slots in the TV prime time.

Using the fast-forward trick mode function afforded by the NPVR service, an NPVR user may fast-forward a TV program to skip commercials therein, or portions of a show which may contain product placement advertisements.

An exemplary NPVR service, within which one or more aspects of the invention may be employed, will now be described. It should be understood that the described NPVR service is exemplary and not meant to be limiting, as one or more embodiments of the invention may be employed with other NPVR services, differing from that described, or with other systems, such as, for example, DVRs.

FIG. 1 illustrates broadband communications system 100 for providing the NPVR service, which is readily modifiable to implement inventive techniques based on the disclosure hereinbelow. For example, system 100 in this instance includes a cable system for delivering information and entertainment programs to set-top terminals (also known as set-top boxes) on the user premises. As shown in FIG. 1, system 100 includes head-end 105, hub 120, hybrid fiber coax (coaxial) (HFC) cable network 140 and different service area nodes including node 150, which in this instance is connected to set-top terminals 158-1 through 158-L in a neighborhood, where L is an integer Head-end 105 receives programs and services from various providers and sources, e.g., analog and digital satellite sources, application servers, media servers, the Internet, and the like Analog and digital satellite sources typically provide the traditional forms of television broadcast programs and information services. Application servers typically provide executable code and data for application specific services such as database services, network management services, transactional electronic commerce services, system administration console services, other application specific services (such as stock ticker, sports ticker, weather and interactive program guide data), resource management services, connection management services, subscriber care services, billing services, operation system services, and object management services. Media servers provide time-critical media assets such as MPEG-2 encoded video and audio, MPEG-2 encoded still images, bit-mapped graphic images, Pulse Code Modulation (PCM) digital audio, three dimensional graphic objects, application programs, application data files, etc. Although specific examples of programs and services which may be provided by the aforementioned sources are given herein, other programs and services may also be provided by these or other sources.

Acquisition/Staging (A/S) processor 109 in head-end 105 processes program materials including, e.g., TV program streams, from one or more of the aforementioned sources in analog and digital forms. Processor 109 can, in one or more embodiments, be operative to carry out one or more method steps as described herein, for example, with regard to FIGS. 12 and/or 13. Other elements to be described below, such as, for example, media processor (VOD server) 119 and/or set-top terminal(s) 158 can also be operative to carry out one or more of such steps, alone or in conjunction with other elements. Analog TV program streams may be formatted according to the National Television Standards Committee (NTSC) or Phase Alternating Line (PAL) broadcast standard Digital TV streams may be formatted according to the Digital Video Broadcasting (DVB), Society of Cable Telecommunications Engineers (SCTE), or Advanced Television Systems Committee (ATSC) standards. Processor 109, among other things, extracts program content in the analog and digital TV streams and reformats the content to form one or more MPEG-2 encoded transport streams. Such reformatting may even be applied to those received streams already in an MPEG-2 format. This stems from the fact that the digital content in the received MPEG-2 streams is typically encoded at a variable bit rate (VBR) To avoid data "burstiness," processor 109 in a conventional manner re-encodes such digital content at a constant bit rate (CBR) to form the aforementioned transport streams.

An MPEG-2 transport stream contains multiple program streams with different video and audio feeds multiplexed for transmission through the same transmission channel. The program streams representing individual programs are identified by respective program identifications (IDs) within a transport stream. It should be noted at this point that the term "transmission channel" should not be confused with a "program channel." A "transmission channel" signifies a designated frequency band through which a transport stream is transmitted. On the other hand, a "program channel" signifies the source of the program material selected by a user to view. For example, a user may select program channel 2 to view program material provided by CBS, program channel 23 to view program material provided by Home Box Office (HBO); program channel 32 to view program material provided by Music Television (MTV), and so on. At this juncture, it should be noted that compression techniques other than MPEG-2 may be employed.

In this illustrative embodiment, the transmission channels, each carrying a transport stream, may be 6 MHz bands populating a forward passband, e.g., a 350-750 MHz band, of a coaxial cable, which is allocated for downstream communication from head-end 105 to a given set-top terminal 158.

A/S processor 109 may receive "assets" including pre-staged movie videos, news reports, sports events, etc. from content providers. However, processor 109 may also create "assets" in real time while processing received program materials which are not pre-staged by the content providers. In general, an "asset" is a container and/or reference for any object or set of objects that may be desired in order to implement a service, including video, audio, images, application executables, scripts, configuration files, text, fonts, and hypertext mark-up language (HTML) pages (or pointers referencing their storage locations). In addition to the raw content, metadata is also a part of an asset object that describes characteristics of the asset For example, asset metadata may describe attributes that are inherent in the content of the asset, such as the rating, format, duration, size, or encoding method Values for asset metadata are typically determined at the time the asset is created, but can also be determined before such time and then populated into appropriate locations when the asset is created.

Figure 2:
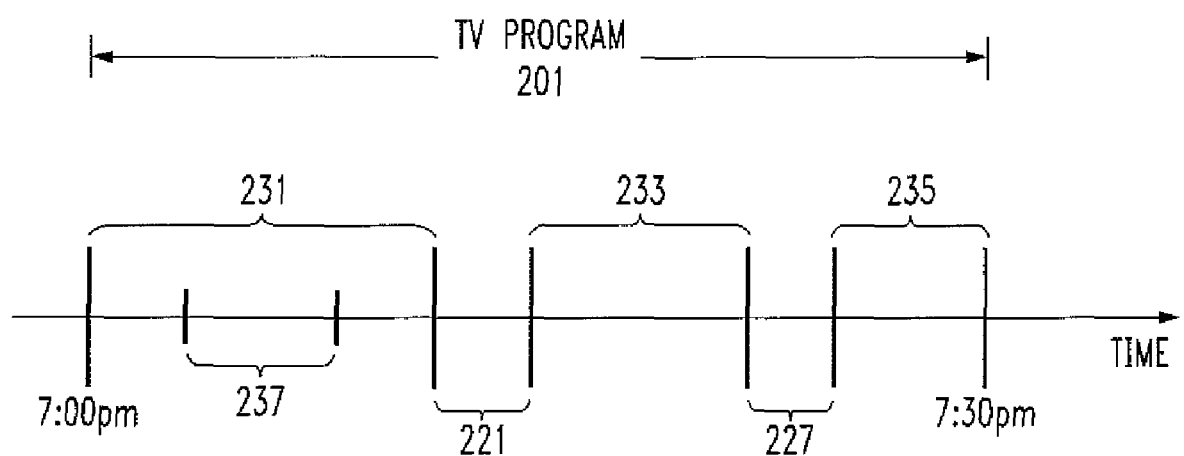
FIG. 2 illustrates a TV program comprising multiple program segments which is provided in the system of FIG. 1.

An asset concerning a program may, in some instances, include trick files associated with the program as well. Still with reference to FIG. 1, and with reference also now to FIG. 2, TV program 201 spans from 7:00 p.m. to 7:30 p.m. Program 201 comprises a show interrupted by commercials, which is typical. Thus, the program content in this instance consists of show segments 231, 233 and 235, interleaved with commercial segments 221 and 227. The TV program streams received by processor 109 are pre-processed, e.g., by the providers, to include sensible flags (indicators), such as, for example, cue-tones, on which processor 109 relies to identify the demarcations (or edges) of different programs and program segments within each program. Thus, in this instance, before processor 109 processes the TV program stream containing TV program 201, a first cue-tone has been inserted at the beginning of segment 231, indicating the beginning of TV program 201; second cue-tones have been inserted at the beginnings of segments 221 and 227, indicating the beginnings of the respective commercial segments; third cue-tones have been inserted at the ends of segments 221 and 227, indicating the ends of the respective commercial segments; and a fourth cue-tone has been inserted at the end of segment 235, indicating the end of TV program 201. Another set of cue-tones may be inserted to delimit a "chapter" (denoted 237) within a program. A chapter is a self contained subprogram, e.g., a skit, monolog, song performance, news report, weather report, etc. within a program. With the cue-tones defining one such chapter, processor 109 is capable of identifying the chapter and creating an asset concerning the same.

For illustrative purposes, assume that TV program 201 in this instance is an initial broadcast program. Processor 109, among other things, collects in a database (not shown) program guide data associated with different TV programs which are not pre-staged (including TV program 201 in this instance) from an application server, which may be different from the sources of the TV programs themselves. Each program when presented to processor 109 is identified by a program designation, which may be used to locate the corresponding program guide data. In particular, processor 109, while processing TV program 201, may locate the corresponding program guide data to create, in teal time, the metadata file associated with TV program 201. The metadata file thus created includes such data as the title, rating (e.g., G, PG-13, R, etc.), names of the producer, director, and actors, duration of the program, program type (e.g., situation comedy), and so on.

Note that, as used herein, "staging" involves the process of converting video streams to a digital (if not already in digital format), constant bit-rate (CBR), appropriate group-of-pictures (GOP) structure (15 or 30), Internet-protocol (IP) format (for multicasting through a network). Staging is applicable to a variety of scenarios, including Switched Digital Video (SDV), Digital/Analog Simulcast, NDVR/NPVR, video over IP/IPTV, and the like, and works in essentially the same fashion in all the exemplary cases.

In some instances, processor 109 may also create, in real time, trick files associated with program 201, as part of the asset which are used to perform trick mode functions (e.g., pausing, rewinding and fast-forwarding) on program 201 (in one or mole embodiments, processor 109 forms a transport stream, including at least one trick mode video elementary stream, as will be discussed further below with regard to FIGS. 12 and 13). One such trick file in this instance is a "fast-forward" trick file which contains an array of identifiers of I-frames in the program stream (MPEG-2 encoded, in this particular example, as mentioned before) corresponding to program 201 in a forward direction. Another trick file is a "rewind" trick file which contains an array of identifiers of I-frames in the program stream corresponding to program 201 in the reverse direction. The I-frame identifies in the trick files are used as indices or markers for rewinding and fast-forwarding of program 201. It should be noted that not all of the I-frames associated with program 201 are selected for the trick files. Rather, the I-frames are selected periodically along the program stream. Thus, the shorter the period is, the closer the instants from which program 201 can be rewound, and to which program 201 can be fast-forwarded, thereby achieving finer adjustments.

It should be noted that where program 201 is not an initial broadcast program, which may also be pre-staged, commercial segments 221 and 227 may not contain the commercials originally provided by the program provider. Rather, program 201 may, in some instances be repackaged with after-market commercials, which may be targeted to the user, and which may even be injected anywhere in the program with no regard for original segments 221 and 227 in terms of their timing, duration, or quantity. In the event that program 201 is pre-staged, the program content comes with the corresponding metadata file and trick files associated with the program. Further, in some instances, processor 109 stores the created or pre-staged asset including the metadata file and trick files associated with a program according to its program designation in asset storage (not shown), which may reside in library manager 113 described below (again, as noted, in one or more embodiments, processor 109 forms a transport stream including at least one trick mode video elementary stream, as will be discussed further below with regard to FIGS. 12 and 13).

The transport streams generated by processor 109, which contain live TV programs in this instance, are fed to cache manager 111. The latter includes a cache memory (not shown), e.g., a disk cache, having a memory capacity on the order of terabytes. Manager 111 copies the transport streams onto the cache memory, and also forwards the same to library manager 113 for long-term storage. The latter includes library storage having a memory capacity on the order of hundreds of terabytes, much larger than that of the cache memory, such that the cache memory stores the last Y hours' worth of the TV programs while the library storage stores the last Z hours' worth of the TV program, where the value of Z is much greater than that of Y. It suffices to know for now that use of the cache memory, which affords faster access to its content than the library storage, facilitates a speedy retrieval of a requested program in the event of a "cache hit," i.e., the requested program being within the last Y hour broadcast. Conversely, a "cache miss" requires locating the requested program in the library storage, thereby incurring a delay in the retrieval of the program.

Network controller 125, among things, assigns resources for transporting program materials to set-top terminals and communicates various data, including system information, to and from the terminals. Upstream data from a set-top terminal 158 to network controller 125 is communicated via a reverse passband, e.g., a 5-40 MHz band, of a coaxial cable. The reverse passband comprises reverse data channels (RDCs) having a 1 MHz bandwidth in this instance, through which quaternary phase shift keying (QPSK) signals containing upstream data are transmitted. It should be noted that the 1 MHz bandwidth allocated for an RDC here is for illustrative purposes only. It will be appreciated that a person skilled in the art may allocate other bandwidths for RDCs, depending on the actual implementation. A set-top terminal utilizes an RDC for sending both application data and control messages. For example, the Digital Audio Visual Council (DAVIC), a standard setting organization, has defined a contention-based access mechanism whereby multiple set-top terminals share an RDC. This mechanism enables the set-top terminals to transmit upstream messages without a dedicated connection to a QPSK demodulator. The mechanism also provides equal access to the set-top terminals that share the RDC, and enables detection and recovery from reverse path collisions that occur when two or more of the terminals transmit an upstream message simultaneously. As also specified by DAVIC, for communications purposes, the set-top terminals and network controller 125 are identified by the Internet protocol (IP) addresses assigned thereto. However, these IP addresses may be randomly assigned each time when system 100 is reconfigured. As a result, the IP address of a set-top terminal 158 or controller 125 may change after a system reconfiguration. Nevertheless, each set-top terminal 158 and controller 125 is also assigned a media access control (MAC) address on a permanent basis, surviving any system reconfiguration.

Downstream data from network controller 125 to a set-top terminal 158 is communicated via forward data channels (FDCs). These channels, often referred to as "out-of-band" channels, may occupy the 70-130 MHz band of a coaxial cable. QPSK signals containing system messages to a set-top terminal 158 are transmitted through an FDC having a 1 MHz bandwidth in this instance. It should be noted that the 1 MHz bandwidth allocated for an FDC here is for illustrative purposes only. It will be appreciated that a person skilled in the art may allocate other bandwidths for FDCs depending on the actual implementations.

When a user at a set-top terminal, say, terminal 158-1, turns on the TV associated therewith and selects a particular program channel, say, program channel 2, or changes from another channel to channel 2, terminal 158-1, in a well known manner, scans for any transport streams transporting programs to the neighborhood. In system 100, each transport stream is identified by a unique transport stream identification (TSID).

Figure 3:
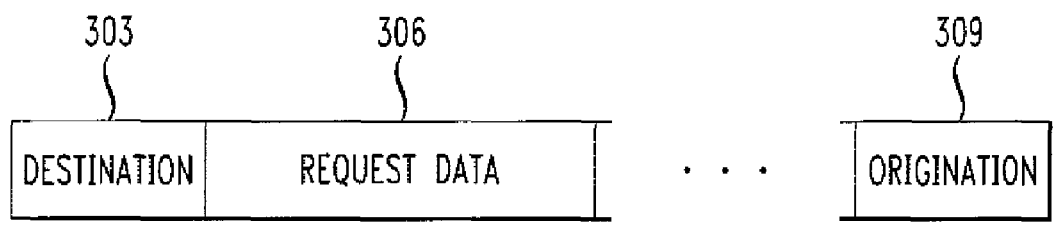
FIG. 3 illustrates a request for program material from a set-top terminal in the system of FIG. 1.

Continuing the above example, once the TSIDs of the transport streams are detected, terminal 158-1 sends, through QPSK modem pool 127, a request for program channel 2 material. Reference should also be had to FIG. 3, which illustrates one such request (denoted 300) sent from a set-top terminal to network controller 125 via an RDC. As shown in FIG. 3, request 300 includes, among other things, destination field 303, which in this instance contains the IP address of network controller 125 for which request 300 is destined; request data field 306 which contains data concerning the detected TSIDs and the requested program channel material, e.g., program channel 2 material in this instance; and origination field 309 which in this instance contains the IP (and/or MAC) address of terminal 158-1 from which request 300 originates.

Figure 4:
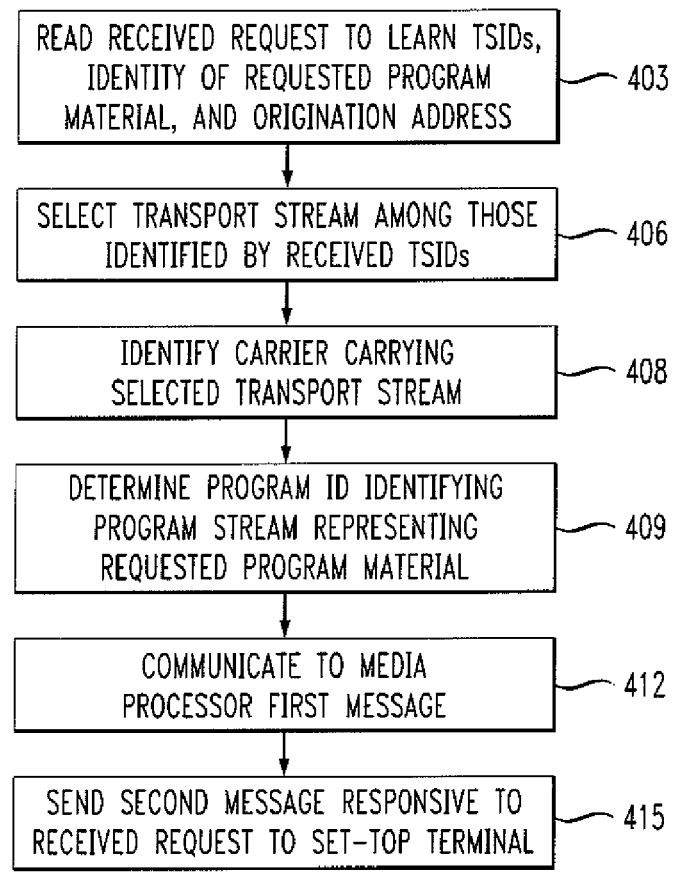
FIG. 4 is a flow chart depicting a process for providing program material in response to the request of FIG. 3.

Reference should now also be had to FIG. 4. After receiving request 300, network controller 125 reads the received request to learn the TSIDs, the identity of the requested program material, and the origination address therein, as indicated at step 403 in FIG. 4. Network controller 125 communicates with media processor 119 (also referred to herein as a video-on-demand (VOD) server) to determine the capacity required for transmitting the requested program material. Based on the required capacity, controller 125, at step 406, selects a transport stream, among those identified by the received TSIDs, which is suitable for transporting the requested program material. Controller 125, at step 408, identifies the carrier carrying the selected transport stream.

Figure 5:
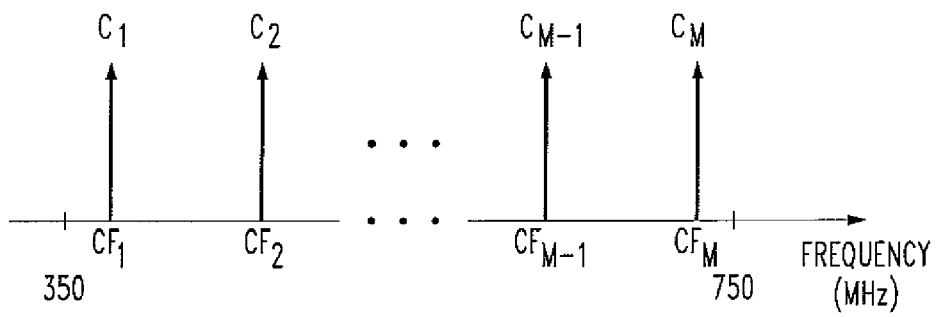
FIG. 5 illustrates selected carriers for transmitting program materials in a forward passband of the system of FIG. 1.

Referring also back to FIG. 1, modulator bank 123 in this instance is located in hub 120, connected to head-end 105 via IP transport on the one hand, and to HFC cable network 140 on the other hand. Bank 123 includes multiple modulators, each of which is used to modulate transport streams onto different carriers. Each modulated carrier carrying a transport stream is transmitted through an associated transmission channel. With further reference now to FIG. 5, M carriers are illustrated therein, designated as $C_1$ through $C_M$, associated with M transmission channels in the forward passband. As shown in FIG. 5, the carrier frequency of $C_1$ is denoted $CF_1$; the carrier frequency of $C_2$ is denoted $CF_2$; and so on, with the carrier frequency of $C_M$ denoted $CF_M$. In this example, each program stream may contain 4.2 Mb/s video and audio program data. By using a 256-quadrature-amplitude-modulation (256-QAM) technique and 6 MHz transmission channel, each modulator in modulator bank 123, in this instance, may modulate nine or more program streams, multiplexed in a transport stream, onto the corresponding carrier. The resulting modulated carrier is transmitted through the transmission channel associated with the carrier.

Network controller 125 may include therein a carrier assignment table which lists, for each carrier, the TSID of the transport stream carried thereby. The carrier identification by network controller 125 at aforementioned step 408 may be achieved by looking up, from the table, the carrier associated with the TSID of the selected transport stream. Based on the requested program channel, network controller 125, at step

409, determines the program ID identifying the program stream representing the requested program material, i.e., program channel 2 material in this instance, which is then multiplexed with other program streams in the selected transport stream. At step 412, network controller 125 communicates, to media processor 119, a first message containing the identity of the modulator in modulator bank 123 which corresponds to the carrier, say, $C_1$, just determined, and the program ID associated with the requested program channel material just determined. At step 415, network controller 125 sends, through QPSK modem pool 127, a second message, responsive to the received request, to set-top terminal 158-1, which is identified by the origination IP (and/or MAC) address in field 309 of request 300. This second message traversing an FDC contains the information concerning the carrier frequency, i.e., $CF_1$ in this instance, to which terminal 158-1 should tune to receive the appropriate transport stream, and the program ID for extracting the desired program stream, representing in this instance program channel 2 material, within the transport stream.

In response to the first message, processor 119 directs cache manager 111 to deliver a copy of the program stream representing the requested program channel material thereto and causes the program stream to be multiplexed with any other program streams already in the transport stream identified by the selected TSID. In addition, processor 119 causes switching unit 117 to switch the resulting transport stream to the modulator corresponding to the carrier $C_1$. Accordingly, the modulator modulates the earlier $C_1$ with the received transport stream, and causes transmission of the modulated carrier through the transmission channel associated with $CF_1$.

Based on the information in the second message, terminal 158-1 tunes to the carrier frequency $CF_1$ to receive the transmitted transport stream, and extracts therefrom the desired program stream, representing program channel 2 material in this instance. In a well-known manner, terminal 158-1 converts the extracted program stream to appropriate signals for the associated TV to play program channel 2 material.

While the program channel 2 material is being played, terminal 158-1 continuously registers the last I-frame identifier in the received transport stream. From time to time, terminal 158-1 sends a "heartbeat" containing the IP (and/or MAC) address identifying terminal 158-1 and the last I-frame identifier to media processor 119. Processor 119 keeps, for terminal 158-1, a record identified by the IP (and/or MAC) address of terminal 158-1, and tracks the program being transmitted to terminal 158-1 and its I-frame progress When processor 119 no longer receives heartbeats from terminal 158-1, e.g., because of an off state of the terminal, processor 119 may cause the transmission of the transport stream to terminal 158-1 to be halted.

Figure 6:
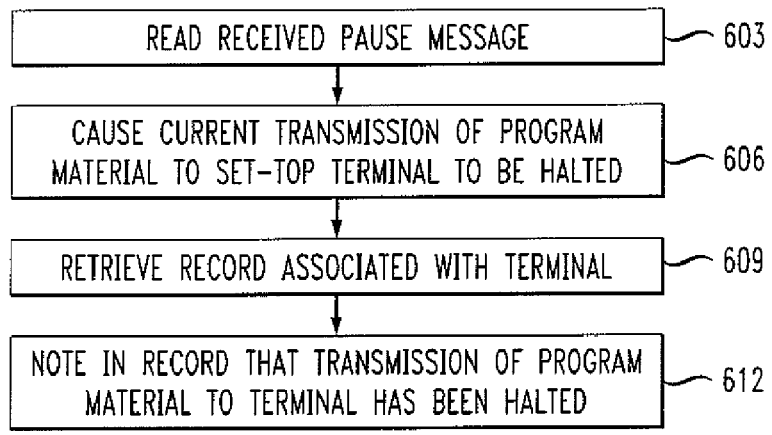
FIG. 6 is a flow chart depicting a process for pausing a program in response to a pause message from a set-top terminal.

A "pause" operation, as may be performed in some instances, will now be described. When the user issues a pause command to terminal 158-1, e.g., by pressing a "pause" key on a remote control associated therewith to temporarily stop the progress of the program, terminal 158-1 issues a pause message to media processor 119 identified by its IP address. The pause message in this instance includes a pause initiation command, the last I-frame identifier registered by terminal 158-1, and the IP and/or MAC address of terminal 158-1. After issuing the pause message, terminal 158-1 enters a pause state and causes the picture corresponding to the next I-frame, say I-frame$_{pause}$, to be frozen on the TV screen, thereby achieving the pause effect Attention should now also be given to FIG. 6. After receiving the pause message, processor 119 reads the received pause message, as indicated at step 603 in FIG. 6. Processor 119, at step 606, causes the current transmission of the program material to set-top terminal 158-1 (identified by the received IP and/or MAC address) to be halted at the I-frame immediately following the last I-frame identified in the received message. Processor 119, at step 609, retrieves the record associated with terminal 158-1. Processor 119, at step 612, notes in the record that the transmission of the program material to terminal 158-1 has been halted at I-frame$_{pause}$.

When the user issues a command to resume viewing the program material, e.g., by toggling the pause key on the remote control, terminal 158-1 exits the pause state, sends a resumption message to processor 119, and readies itself to receive the program material starting from I-frame$_{pause}$. This resumption message includes a resumption command, and the IP and/or MAC address of terminal 158-1. After reading the received resumption message, processor 119 retrieves the record associated with terminal 158-1 identified by the received IP and/or MAC address. In response to the resumption command, processor 119 causes the transmission of the program material to terminal 158-1 to be restarted from I-frame$_{pause}$, and notes in the record the transmission resumption event. As a result, terminal 158-1 resumes receiving the program material in the same program stream delivered thereto before. It should be noted that use of a MAC address, instead of an IP address, to identify terminal 158-1 may be advantageous here especially when the pause state is long, so much so that a reconfiguration of system 100 may have occurred during such a state. In that case, the IP address identifying terminal 158-1 before the system reconfiguration may be different than that after the reconfiguration, and as a result, by using only the pre-reconfiguration IP address of terminal 158-1 for its identification, the resuming program stream would not be delivered to the intended terminal 158-1 after the reconfiguration. On the other hand, since the MAC address of terminal 158-1 is immutable and survives any system reconfiguration, by relying on the MAC address of terminal 158-1 for its identification here, the resuming program stream would be correctly delivered to terminal 158-1 even after a system reconfiguration.

Figure 7:
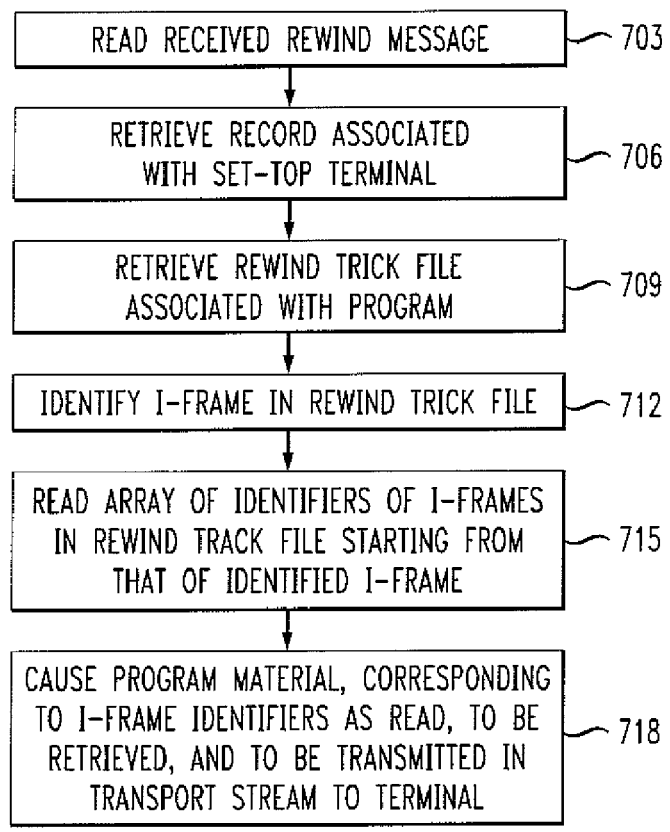
FIG. 7 is a flow chart depicting a process for rewinding a program in response to a rewind message from a set-top terminal.

"Rewind" and "fast forward" operations will now be described in the context of an approach where processor 109 stores the created or pre-staged asset including the metadata file and trick files associated with a program according to its program designation in the aforementioned asset storage, which may reside in library manager 113. It should be kept in mind, however, that in one or more exemplary inventive approaches, such as will be described below with regard to FIGS. 12 and 13, processor 109 forms a transport stream with tick modes encapsulated therein, and facilitates streaming of the transport stream within the network, to the VOD server 119 and even, in some embodiments, to the set top boxes 158. A "rewind" operation, as may be performed in some instances where the trick files are in asset storage, will now be described. While viewing a program, the user may issue a rewind command, e.g., by pressing a rewind key on the remote control, to rewind the program. In that case, terminal 158-1 issues a rewind message to processor 119 (identified by its IP address). This rewind message includes a rewind initiation command, the last I-frame identifier registered by terminal 158-1, and the IP address (and/or MAC address) identifying terminal 158-1. Attention should now be given to FIG. 7. After receiving such a rewind message, processor 119 reads the received rewind message, as indicated at step 703 in FIG. 7. Processor 119, at step 706, retrieves the record associated with set-top terminal 158-1, identified by the received IP address (and/or MAC address). Knowing from the record the identity of the program being transmitted, processor 119, at step 709, retrieves from the aforementioned asset storage the rewind trick file associated with the program. Based on the last I-frame information in the received message, processor 119 at step 712 identifies the I-frame in the rewind trick file which either matches or is the closest to that last I-frame. Processor 119 at step 715 reads the array of identifiers of the I-frames in the rewind trick file starting from that of the identified I-frame Processor 119 at step 718 causes the program material, corresponding to the I-frame identifiers as read, to be retrieved from cache manager 111, and to be transmitted in the transport stream to terminal 158-1, thereby achieving the desired rewind effect.

When the user issues a command to stop rewinding the program, e.g., by toggling the rewind key on the remote control, terminal 158-1 sends a rewind termination message to processor 119. This message includes a rewind termination command, and the IP address (and/or MAC address) of terminal 158-1. In response to the rewind termination command, processor 119 stops reading the rewind trick file associated with the program. Processor 119 learns from the record associated with terminal 158-1 the last I-frame identifier read from the rewind trick file Processor 119 causes retrieval of the program material at the normal forward speed from cache manager 111 (starting from the I-frame identified by the last read identifier) and transmission of the retrieved program material to terminal 158-1. As a result, terminal 158-1 resumes receiving the program material at the normal forward speed in the same transport stream.

Figure 8:
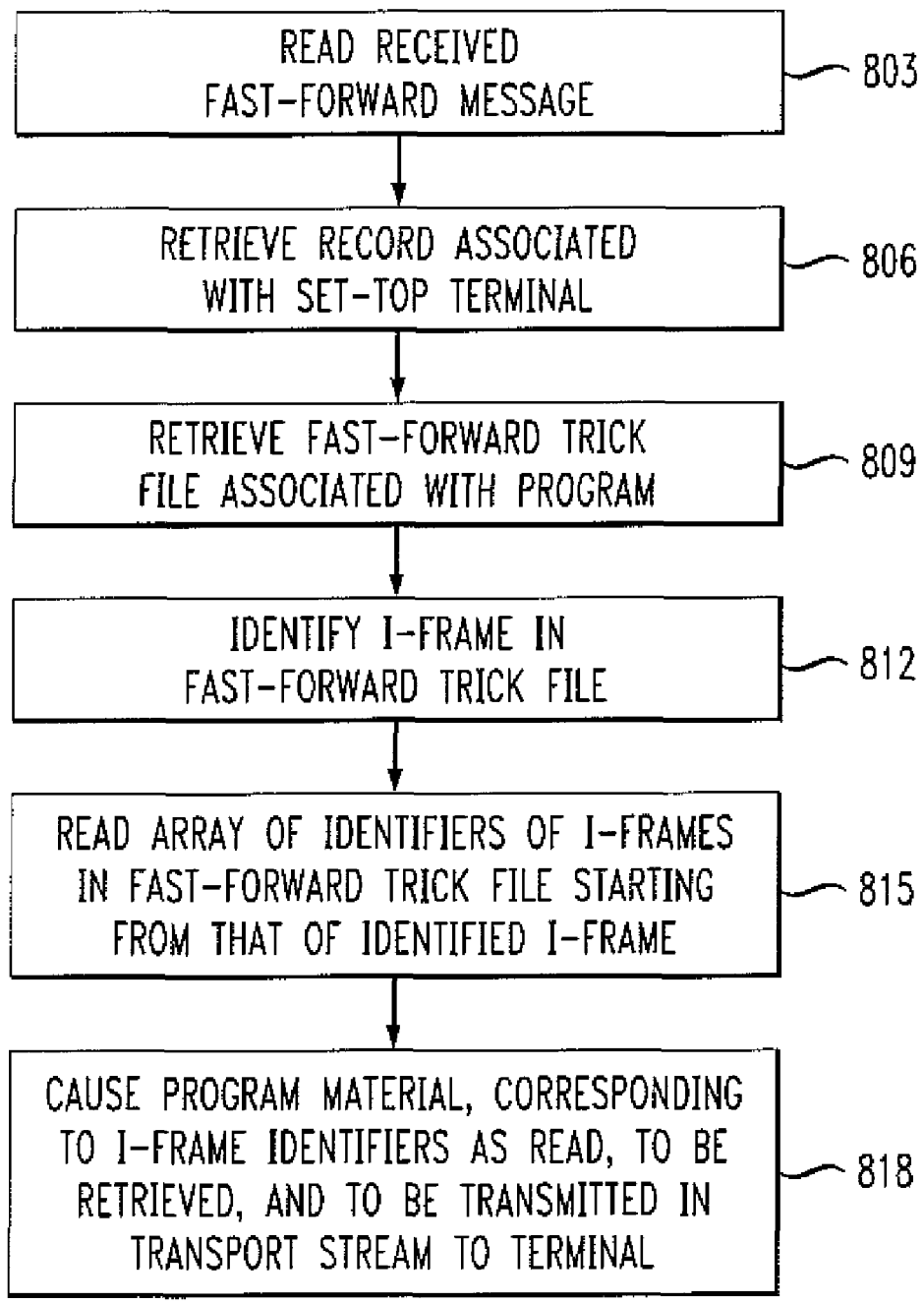
FIG. 8 is a flow chart depicting a process for fast-forwarding a program in response to a fast-forward message from a set-top terminal.

A "fast forward" operation, as may be performed in some instances where the trick files are in asset storage, will now be described. After rewinding a program (or indeed, at some other time), the user may issue a fast-forward command, e.g., by pressing a fast-forward key on the remote control, to fast-forward the program. In that case, terminal 158-1 issues a fast-forward message to processor 119 (identified by its IP address). This fast-forward message includes a fast-forward initiation command, the last I-frame identifier registered by terminal 158-1, and the IP address (and/or MAC address) identifying terminal 158-1. Refer also now to FIG. 8. After receiving such a fast-forward message, processor 119 reads the received fast-forward message, as indicated at step 803 in FIG. 8. Processor 119, at step 806, retrieves the record associated with set-top terminal 158-1 identified by the received IP address (and/or MAC address). Knowing from the record the identity of the program being transmitted, processor 119, at step 809, retrieves from the aforementioned asset storage the fast-forward trick file associated with the program. Based on the last I-frame information in the received message, processor 119, at step 812, identifies the I-frame in the fast-forward trick file which either matches or is the closest to that last I-frame. Processor 119, at step 815, reads the array of identifiers of the I-frames in the fast-forward trick file starting from that of the identified I-frame. Processor 119 at step 818 causes the program material, corresponding to the I-frame identifiers as read, to be retrieved from cache manager 111, and to be transmitted in the transport stream to terminal 158-1, thereby achieving the desired fast-forward effect.

When the user issues a command to stop fast-forwarding the program, e.g., by toggling the fast-forward key on the remote control, terminal 158-1 sends a fast-forward termination message to processor 119 This message includes a fast-forward termination command, and the IP address (and/or MAC address) of terminal 158-1. In response to the fast-forward termination command, processor 119 stops reading the fast-forward trick file associated with the program. Processor 119 learns, from the record associated with terminal 158-1, the last I-frame identifier read from the fast-forward trick file. Processor 119 causes retrieval of the program material at the normal forward speed from cache manager 111 (starting from the I-frame identified by the last read identifier) and transmission of the retrieved program material to terminal 158-1. As a result, terminal 158-1 resumes receiving the program material at the normal forward speed in the same transport stream.

Again, it should be noted that while various exemplary trick mode implementations have just been described, it is to be understood that in accordance with one or more exemplary embodiments of the invention, one or more trick mode video elementary streams are encapsulated in a transport stream within a network (network in this context to be broadly understood to include conventional networks as well as the interconnections between elements in head end 105, transport from a satellite, over network 140, as well as all the way to consumer premises equipment). Indeed, at this point it should be mentioned that transport or propagation "within a network," within the context of the present invention, is intended to broadly encompass transport or propagation between at least two elements, as opposed to within a single element such as a receiver.

It should also be pointed out at this juncture that in the above illustrative embodiment, the transport streams generated by processor 109, which contain, e.g., in-progress (or live) TV broadcast(s), are recorded in cache manager 111, followed by library manager 113, before they are fed to the requesting set-top terminals. As a result, the transport streams received by the terminals actually are recorded copies of the streams generated by processor 109 However, in another embodiment, the transport streams generated by processor 109 are fed to the requesting set-top terminals in real time, and at the same time switched to cache manager 111 and library manager 113 for recording thereof. Thus, in this other embodiment, when a user at a set-top terminal performs a trick mode function on an in-progress TV broadcast program, say, rewinding the program, the realtime transport stream being received by the terminal is immediately replaced by a second transport stream containing a recorded copy of the TV program, e.g., from cache manager 111. If after rewinding the program, the user invokes a fast-forwarding command to fast-forward the recorded TV program, there may come a point where the recorded TV program catches up with the in-progress program. In that case, the second transport stream being received by the terminal may be replaced by the realtime transport stream containing the in-progress program. It should be noted at this point that inventive techniques involving the streaming of encapsulated trick modes, such as, for example, those discussed below with regard to FIGS. 12 and 13, are preferably applied to non-real-time propagation and streaming applications, inasmuch as time stamping (presentation time stamp or "PTS") should be maintained.

Figure 9:
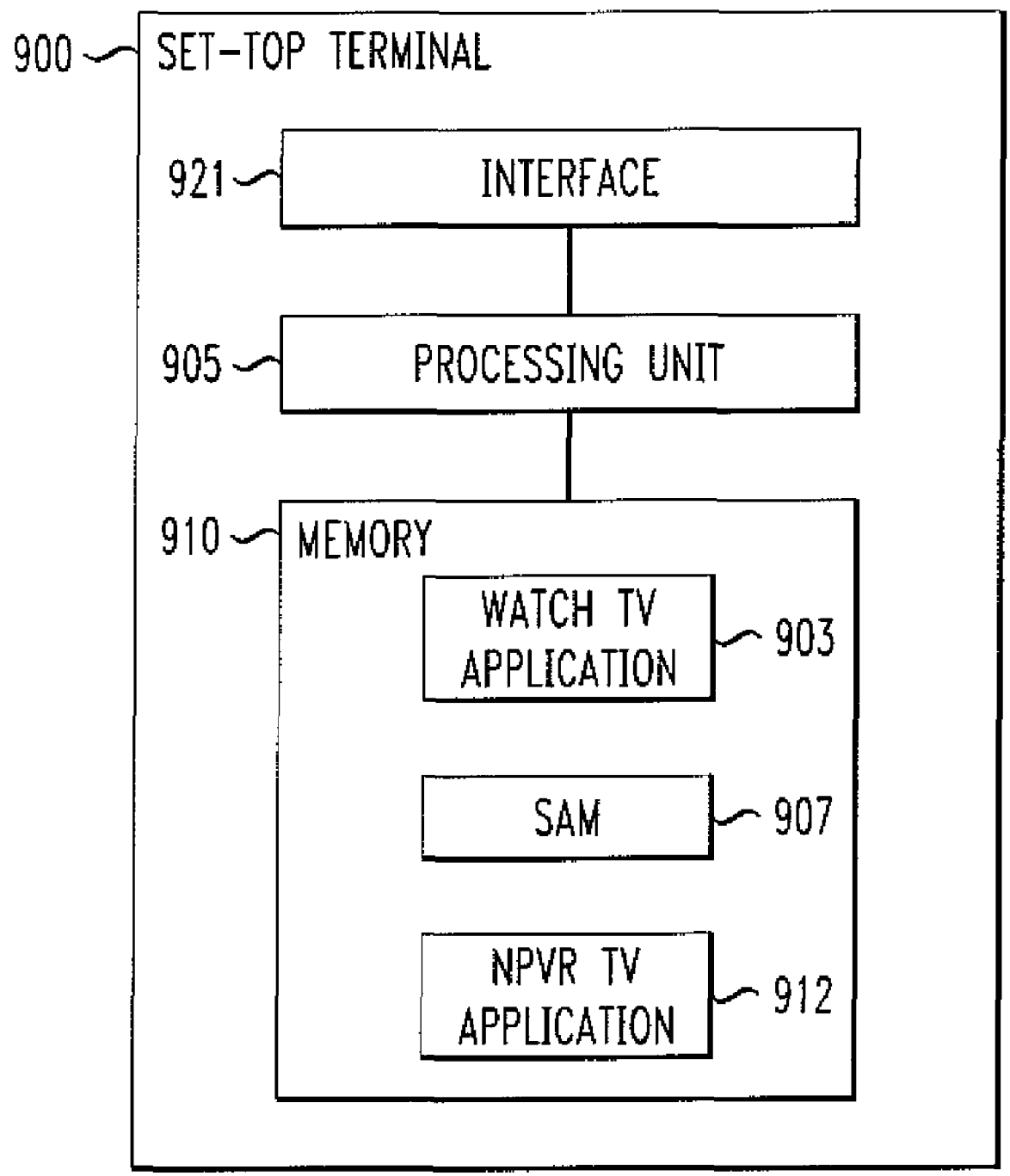
FIG. 9 is a block diagram of a set-top terminal.

As mentioned before, selected program channels (or programs) may be afforded the above-described NPVR service while the rest of the program channels (or programs) may be afforded the traditional broadcast service. Refer now also to FIG. 9. A conventional "Watch TV" application (denoted 903 in FIG. 9) is installed in a set-top terminal (denoted 900) to service those program channels (or programs) afforded the traditional broadcast service. It should be noted that set-top terminal 900 here generically represents one of set-top terminals 158-1 through 158-L. Watch TV application 903, residing in memory 910, provides such well known functions as channel navigation control, channel selection in response to a channel change event, etc. A channel change event occurs when a user at set-top terminal 900 issues a command to change from one program channel to another. Such a command may be issued, say, using a remote control (not shown), which signal is receptive by set-top terminal 900. Memory 910 in this instance comprises one or more caches, disks, hard drives, non-volatile random access memories (NVRAMs), dynamic random access memories (DRAMs), read-only memories (ROMs), and/or Flash ROMs.

For example, in memory 910, NVRAM may be used for storage of a user's settings and set-top terminal configuration settings, such as parental control codes, favorite channel lineups, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, DOLBY DIGITAL® (registered mark of Dolby Laboratories Licensing Corporation, San Francisco, Calif.) Adaptive Transfer Coding 3 (AC-3) audio decoding, and video manipulation. ROM may be used for storage of the operating system. Flash ROM may be used for storage of resident application software, as well as patches of the operating system and application software, which software and/or patches are downloaded to set-top terminal 900 from head-end 105 after set-top terminal 900 has been deployed at the user's premises.

Processing unit 905 orchestrates the operations of set-top terminal 900. It executes instructions stored in memory 910 under the control of the operating system. Service application manager (SAM) 907 forms part of such an operating system of terminal 900. SAM 907 is responsible for, among other things, monitoring channel change events; administering channel, service and other tables in terminal 900; and maintaining a registry of applications in terminal 900. One such application is the aforementioned Watch TV application 903 which is invoked to service a traditional broadcast channel (or program). Another application is "NPVR TV" application 912 which is invoked to service NPVR enabled channels (or programs), and which may be downloaded from head-end 105 to memory 910. Application 912, among other things, responds to rewind, pause and fast-forward commands initiated by a user, and communicates such commands to head-end 105 through interface 921 to perform the trick mode (i.e., rewind, pause and fast-forward) functions on programs in the manner described before, with the exception of some instances where selected programs may not be afforded the fast-forward trick mode capability. In addition, for example, application 912 not only allows a user to reserve future broadcast programs for review, but also reserve, play or restart programming content that has broadcast in accordance with a "Look Back" feature. Processor 905 can also be configured by memory 910 to perform one or more method steps as described herein, particularly with regard to the approach in FIG. 13 wherein a transport stream with encapsulated trick modes is sent to set-top box 158.

The aforementioned Look Back feature enables a user to access programming content that has broadcast during a "Look Back Period"—i.e., up to a predetermined period. The actual length of the period is subject to the negotiated rights to the programming content. Specifically, the Look Back feature enables a user to restart an NPVR program that is currently being broadcast. The Look Back feature also enables a user to play an NPVR program that was previously broadcast within the Look Back Period (e.g., the previous two days). In addition, the Look Back feature enables a user to reserve an NPVR program in its entirety that is presently being broadcast or that was previously broadcast within the Look Back Period for subsequent viewing or archiving Programs that are available through the Look Back feature may be accessed for viewing or reserving in several ways. For example, a Look Back menu may be accessed when viewing content on an NPVR-enabled channel which, in effect, gives that channel an on-demand-like feature. Thus, by accessing a Look Back menu, the viewer may be presented with a categorical listing of all programs that are available for either (1) immediate viewing, or (2) reservation for subsequent viewing. Therefore, the Look Back feature provides a user with the ability to play or reserve previously (or currently) broadcast programs, but does not require the user to denote such programs in advance as a favorite, or to otherwise proactively elect to reserve the program.

Programs that are available through the Look Back feature may be accessed by a listing that may be organized by channel, by reverse chronological order (or chronological order), by theme (movies, sports, drama, etc.), by alphabetical older; etc. The Look Back feature may be made available while a user is viewing a program on an NPVR-enabled channel. Further details on Look Back are presented in the aforementioned US Patent Application Publication 2005-0034171 of Robert Benya.

A Global Look Back feature may also be implemented. The Global Look Back feature enables a user to access a program previously broadcast even if the user does not know on which channel it was broadcast. Further details on Global Look Back are also presented in the aforementioned Benya publication.

Figure 10:
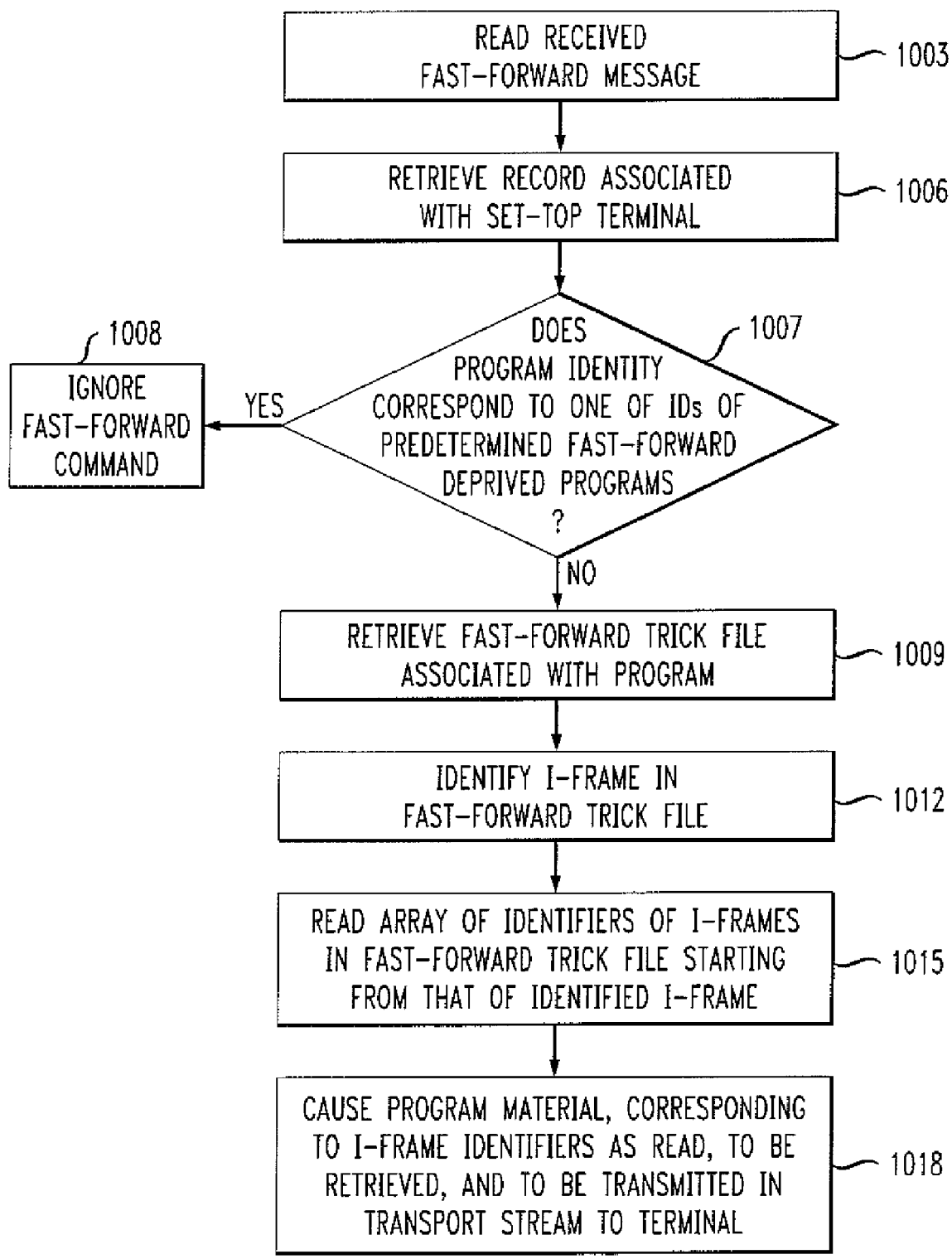
FIG. 10 is a flow chart depicting one manner in which selected programs are not afforded a fast-forward capability.

As mentioned before, in some instances, all or some of the NPVR programs may be deprived of the fast-forward (or other trick mode) capability otherwise afforded by the NPVR service. In the case of the NPVR service, such fast-forward deprived programs may be predetermined programs in a prime time lineup, which may be identified by their program IDs. When a user at terminal 900 issues a fast-forward command, e.g., by pressing a fast-forward key on the remote control, to fast-forward an NPVR program, terminal 900 issues a fast-forward message to media processor 119 identified by its IP address. This fast-forward message includes a fast-forward initiation command, the last I-frame identifier of the program registered by terminal 900, and the IP address (and/or MAC address) identifying terminal 900. Referring to FIG. 10, similar to FIG. 8, after receiving such a fast-forward message, processor 119 reads the received fast-forward message, as indicated at step 1003. Processor 119 at step 1006 retrieves the record associated with set-top terminal 900 identified by the received IP address (and/or MAC address). Knowing from the record the identity of the program being transmitted, processor 119 at step 1007 determines whether the program identity corresponds to one of the IDs of the predetermined, fast-forward deprived programs. If so, processor 119, at step 1008, ignores the fast-forward initiation command, resulting in no fast-forward effect on the program presentation. Otherwise, processor 119, at step 1009, retrieves from the aforementioned asset storage the fast-forward trick file associated with the program. Based on the last I-frame information in the received message, processor 119, at step 1012, identifies the I-frame in the fast-forward trick file which either matches or is the closest to that last I-frame. Processor 119, at step 1015, reads the array of identifiers of the I-frames in the fast-forward trick file starting from that of the identified I-frame. Processor 119, at step 1018, causes the program material, corresponding to the I-frame identifiers as read, to be retrieved from cache manager 111, and to be transmitted in the transport stream to terminal 900, thereby achieving the desired fast-forward effect.

It will be appreciated that other trick modes may be prevented in a similar fashion. When implementing transport stream encapsulated trick modes, according to one or more aspects of the invention, trick modes may be suppressed, for example, by having staging processor 109 insert an indication, and/or a blank area (for example, null padding), within the trick mode file (trick mode stream) for regions where trick modes are to be suppressed.

As discussed in the aforementioned US Patent Application Publication 2005-0034171 of Robert Benya, all or some of the programs on an NPVR enabled channel may be subject to a "prime time on demand" (PTOD) service. Such PTOD programs may be predetermined programs in a prime time lineup, which a user may not be allowed to time-shift for later viewing otherwise allowed by the above-described NPVR service Look Back feature. In a first scenario where, while a user is watching a PTOD program during its broadcast according to the broadcast schedule (e.g., from 8:00 pm to 9:00 pm), the user issues no restart or trick mode command to affect the program presentation, the PTOD program will end according to the broadcast schedule (i.e., 9:00 pm). Since, in accordance with the PTOD service, a user is denied the Look Back feature for later review of a previously broadcast PTOD program, the user's experience in the first scenario is as if he or she watched a regularly scheduled program on a traditional broadcast channel.

Figure 11:
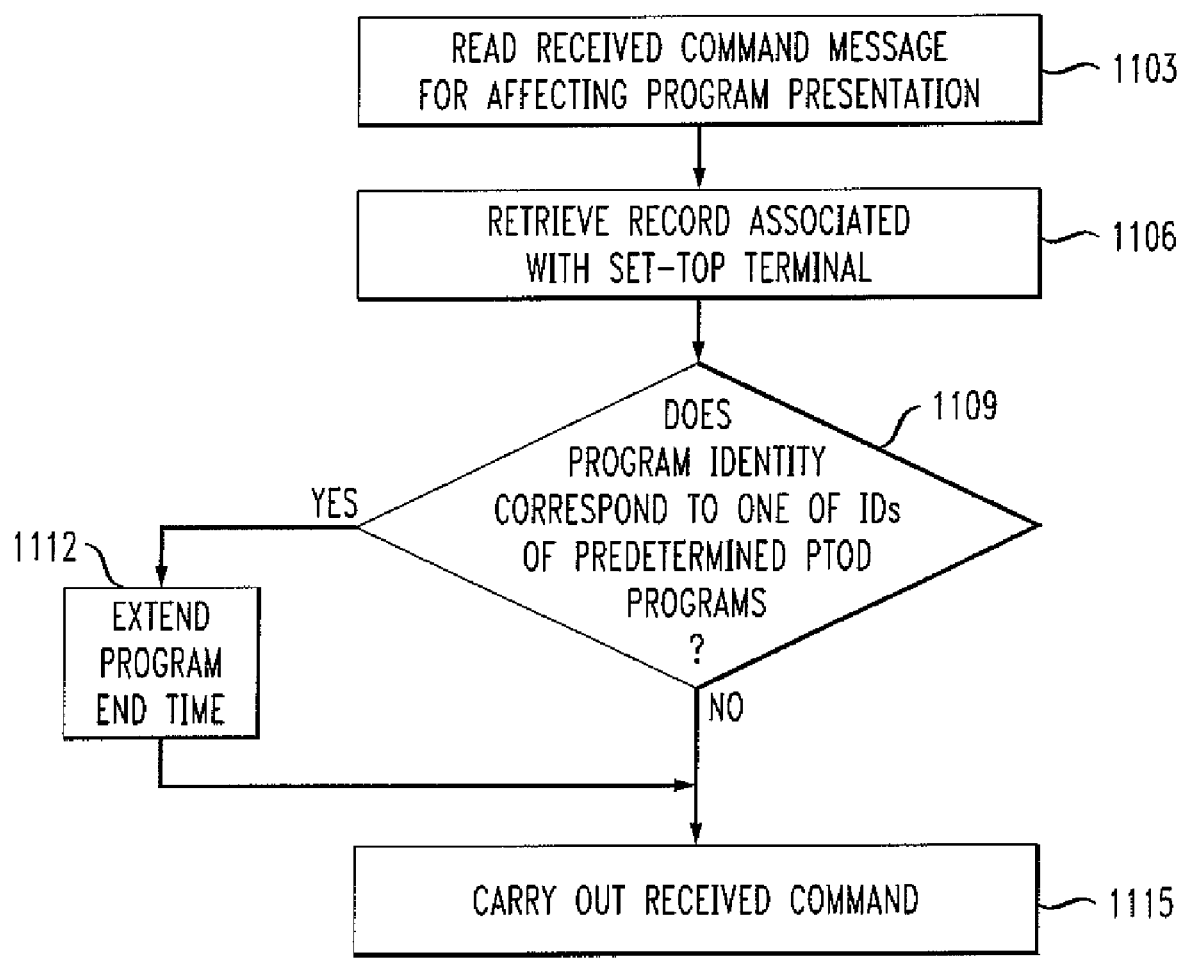
FIG. 11 is a flow chart depicting a process for serving selected programs.

In a second scenario where a user issues a restart or trick mode command to affect a presentation of a PTOD program during its broadcast (i.e., from 8:00 pm to 9:00 pm), the end time of the PTOD program may be extended beyond the broadcast schedule, e.g., by an hour after the scheduled end time (i.e., 9:00 pm+1 hour=10:00 pm in this instance). In this second scenario, referring to FIG. 11, after receiving a command message affecting a program presentation from terminal 900, processor 119 leads the received command message, as indicated at step 1103. Processor 119 at step 1106 retrieves the record associated with set-top terminal 900 identified by the IP address (and/or MAC address) in the received message. Knowing from the record the identity of the program being transmitted, processor at step 1109 determines whether the program identity corresponds to one of the IDs of the predetermined PTOD programs. If so, at step 1112, processor 119 extends the end time of the program (e.g., by an hour). That is, for this particular terminal 900, processor 119 prolongs transmission of the PTOD program content thereto till 10:00 pm, during which the program is afforded the NPVR service features, including the trick mode, and restart functions, but not the Look Back feature for time-shifting the program. In other words, a user in this instance is denied the Look Back feature to revisit the PTOD program after its extended end time, i.e., 10:00 pm. It should be noted that unless the PTOD program is also designated a fast-forward deprived program, the fast-forward function remains effective. It should also be noted that the program end-time extension afforded by processor 119 may be terminated at anytime by the user pressing a first predetermined key, e.g., a STOP key, on a remote control associated with terminal 900, to rejoin the program being broadcast on the same channel, or a second predetermined key to view the program which was broadcast immediately after the PTOD program in question.

The subject routine proceeds from step 1112 to step 1115, described below Otherwise, if it is determined at step 1109 that the program identity does not correspond to one of the IDs of the predetermined PTOD programs, the subject routine proceeds from step 1109 to step 1115 directly, where processor 119 carries out the received command to affect the presentation of the program as desired by the user.

There is, however, a chance that a user may rewind a PTOD program too far to be able to finish the program by its extended end time. For example, let's say the duration of a PTOD program is an hour, and that it is scheduled for broadcast from 8:00 pm to 9:00 pm. Because the user issues a command to manipulate the presentation of the program during its broadcast, the end time of the program is extended to 10:00 pm, in accordance with the PTOD service. If the user at, say, 9:30 pm rewinds more than a half hour's worth of program content, the user cannot reach the end of the program by 10:00 pm at the normal play speed (i.e., without fast-forwarding to skip any program content). Thus, it is desirable to alert the user, while rewinding, at the point of the program beyond which the user will not be able to finish the program by the extended end time. The alert may be generated and inserted into the program transmission by media processor 119, and may comprise a display of such a warning as "You will not be able to finish this program if you rewind past this point." To properly insert one such alert, the program may be indexed according to Normal Play Time (NPT) which, for example, may start at zero, progress in milliseconds, and assume no negative value. The length of time between an NPT start time and an NPT end time corresponds to the actual duration of the program. As mentioned before, the actual duration of the program is indicated in metadata associated with the program. It is understood, however, that the NPT is an organizational tool, and that the NPT may be an arbitrary index. It is also understood that other indexing schemes may be used, instead.

The PTOD service described above may be supplemented with a "Recently Aired" option, selection of which allows a user to view recently aired programs which are defined by the cable operator, subject to negotiated rights to such programs. In addition, a PTOD time window can be imposed while a user is viewing a PTOD program whose end time has been extended. In this aspect, trick mode functions (e.g., rewind, fast-forward, pause, etc.) are effective only during such a PTOD time window, which is a limited time period within the extended PTOD program time. That is, after the PTOD time window expires, processor 119 ignores any trick mode command initiated by the user, and thereby disables the trick mode functionality, for the remainder of the PTOD program. However, before the PTOD time window expires, an alert message may be transmitted by processor 119 to warn the user that the time window is about to expire and that the user would lose the trick mode functionality for the remainder of the PTOD program. Further specific details regarding the PTOD service are presented in the aforementioned US Patent Application Publication 2005-0034171 of Robert Benya.

It will be appreciated that the description thus far, in association with FIGS. 1-11, has presented an example of one specific environment in which one or more techniques of the invention may be practiced. However, the example is not to be taken as limiting Inventive techniques may be practiced in many different environments. For example, one or more inventive techniques can be employed with a system of the kind that incorporates switching techniques to only send signals for programs actually being watched, as set fort in US Patent Application Publication 2003-0056217, kind code A1, of Paul D. Brooks, published Mar. 20, 2003, entitled "Technique for effectively providing program material in a cable television system," the disclosure of which is expressly incorporated herein by reference for all purposes. Further, one or more inventive techniques can be employed with a system that optimizes bandwidth utilization via self-monitoring. Yet further, in the system 100, the network transport is illustratively realized using HFC cable network 140. However, other networks such as digital subscriber line (DSL) networks, Ethernet networks and satellite networks may be used instead. Even further, system 100 is disclosed herein in a form in which various functions are performed by discrete functional blocks. However, any one or more of these functions could equally well be embodied in an arrangement in which the frictions of any one or mole of those blocks or indeed, all of the functions thereof, are realized, for example, by one or more appropriately programmed processors. Thus, it should be kept in mind that techniques of the invention may be advantageously employed wherever assets are to be propagated.

Attention should now be given to FIG. 12, which presents a flow chart 1200 of exemplary steps in a method of propagating an audiovisual asset, according to an aspect of the invention. In this context, an "asset" should be broadly understood to include, but not be limited to, a program, service, stream, and the like. After beginning at block 1202, at block 1204, a representation of the audiovisual asset is obtained "Obtaining" includes, e.g., getting such an asset from an external source, or getting the building blocks of such an asset, whether in digital or analog form, from an external source and then creating the asset, as described above with regard to head-end 105. At block 1206, the representation is processed to obtain at least one normal playback video elementary stream and at least one trick mode video elementary stream. In most cases, it is envisioned that the processing of the representation will result in obtaining at least one audio elementary stream as well, but this need not necessarily be so in all embodiments of the invention. At block 1208, a transport stream is formed from the at least one normal playback video elementary stream, the at least one audio elementary steam (if present), and the at least one trick mode video elementary stream. The at least one trick mode video elementary stream is encapsulated in the transport stream. At block 1210, streaming of the transport stream within a network is facilitated (refer to discussion above regarding understanding of "within a network" in the present context).

The representation of the asset that is obtained could be an analog representation, and the processing carried out in block 1206 could include, for example, digital video compression. The compression technique can be, for example MPEG-2 or H.264/MPEG-4/AVC. In other instances, the representation of the asset that is obtained could be a digital representation; in which case, such digital representation could be, but need not be, a digitally compressed representation. Where a digitally compressed representation is obtained, it might be encoded at a variable bit rate, and the processing in step 1206 could include re-encoding at a constant bit rate. Further pertinent discussion is provided below with regard to FIG. 14.

In one or more embodiments, step 1204 is performed by an acquisition/staging processor, such as processor 109, in a broadband communications system head end 105. Steps 1206 and 1208 can also be performed by processor 109 in some embodiments. In one or more embodiments, the streaming of the transport stream in block 1210 includes sending the transport stream to a VOD server, such as element 119. In a preferred approach, as shown at block 1212, the one or more trick mode video elementary streams are de-encapsulated, for example, by the VOD server 119. The at least one trick mode video elementary stream can include encapsulated trick mode files and the de-encapsulating can include tagging the files. Processing continues at block 1214. The exemplary inventive embodiment of FIG. 12 reduces the synchronization burden between processor 109, asset storage, and processor 119, in connection with presenting trick modes, as compared to previous techniques. It should be noted that once the tick mode (s) are de-encapsulated on VOD server 119, a conventional trick mode file can be created on VOD server 119, and the trick modes in such conventional file can be played using techniques such as those described elsewhere herein. The conventional trick mode file can be created from the de-encapsulated trick modes by, for example, suitable software on VOD server 119.

An alternative approach is shown in FIG. 13. Flow chart 1300 is identical to flow chart 1200, with the labels of the blocks incremented by one hundred, except that instead of de-encapsulating by the VOD server, as in the example above, sending of the transport stream to a set-top box, such as one of the terminals 158, is facilitated. Thus, after beginning at block 1302, at block 1304, a representation of the audiovisual asset is obtained. "Obtaining" again includes, e.g., getting such an asset from an external source, or getting the building blocks of such an asset, whether in digital or analog form, from an external source and then creating the asset, as described above with regard to head-end 105. At block 1306, the representation is processed to obtain at least one normal playback video elementary stream, (optionally, as discussed above, at least one audio elementary stream), and at least one trick mode video elementary stream. At block 1308, a transport stream is formed from the at least one normal playback video elementary stream, the at least one audio elementary stream (where present), and the at least one trick mode video elementary stream. The at least one trick mode video elementary stream is encapsulated in the transport stream. At block 1310, streaming of the transport stream within a network is facilitated Again, the representation of the asset that is obtained could be an analog representation, and the processing carried out in block 1306 could include, for example, digital video compression. The compression technique can be, for example, MPEG-2 or H.264/MPEG-4/AVC. In other instances, the representation of the asset that is obtained could be a digital representation; in which case, such digital representation could be, but need not be, a digitally compressed representation. Where a digitally compressed representation is obtained, it might be encoded at a variable bit rate, and the processing in step 1306 could include re-encoding at a constant bit rate. Further pertinent discussion is provided below with regard to FIG. 14.

In one or more embodiments, step 1304 is performed by an acquisition/staging processor, such as processor 109, in a broadband communications system head end 105. Steps 1306 and 1308 can also be performed by processor 109 in some embodiments In one or more embodiments, the streaming of the transport stream in block 1310 includes sending the transport stream to a VOD server, such as element 119. In the alternative approach of FIG. 13, as shown at block 1312, instead of de-encapsulating by the VOD server, as in the example above, sending of the transport stream to a set-top box, such as one of the terminals 158, is facilitated. Processing continues at block 1314. It should be noted that set top boxes with DVR functionality may advantageously be employed with the approach of FIG. 13. Such set top boxes may be programmed to switch to decoding (playback) of the appropriate trick mode video elementary stream when a trick mode command is received, for example, from a remote control of a user of such set top box Of course, such programming may also include appropriate code to cause decoding of the normal speed video elementary stream when the trick mode ends.

By way of review and further discussion, in certain current VOD and NDVR systems, trick mode files, when created, are typically separate files stored in the system. To assist in propagating assets, one or more inventive embodiments provide trick mode video files within the MPEG-2 (or similar) Transport Stream (TS) packet structure. The MPEG-2 TS allows for multiple video files within the Transport Stream. So, within a typical MPEG-2 TS file, one would find included the normal playback video elementary stream and the audio elementary stream (one or more). One or more inventive embodiments add one or more additional video elementary streams with the Transport Stream. The additional video ES could include various tick mode video files processed by a device in the network, such as element 109, and then inserted into the Transport Stream. Since time stamping (PTS) will need to be maintained, it may be desirable not to employ the trick mode encapsulation for real-time video trick mode playback. One or more inventive techniques may be advantageously used for non-real-time propagation and streaming applications. Since AVC/H.264/MPEG-4 can use the MPEG-2 Transport Stream format for sending video streams, one or more inventive techniques are applicable to both AVC/H.264/MPEG-4 and MPEG-2 video. One or more inventive techniques may be advantageously employed with "pitcher" and "catcher" systems for sending preprocessed trick mode files, and may advantageously reduce processing overhead on network devices (such as VOD server 119, set top box 158, and the like) required for processing trick modes, allowing for easier content propagation. Thus, one or more inventive techniques provide a single encapsulated file for transmitting video files with associated pre-processed trick mode files, and reduce the synchronization burdens on the rest of the system imposed by other techniques.

It should be noted that in usage herein, including the claims, it may be stated that "compression is performed in accordance with one of an MPEG-4, AVC, and H.264 standard." It should be understood that AVC is an implementation of H.264, with AVC providing a narrower CODEC (coder/decoder) for easier implementation H.264 is, in turn, a subset of MPEG-4. Thus, the language "compression is performed in accordance with one of an MPEG-4, AVC, and H.264 standard" is not intended to imply that MPEG-4, AVC, and H.264 are unrelated to each other.

In the preferred approach of FIG. 12, software on VOD server 119 tags trick mode files in the stream and de-encapsulated them. The transport stream may include, for example, a normal playback ("1×") stream, and one or more fast forward and/or reverse streams, for example, ("2×," "4×," "10×," "32×" and/or other desired speeds, where the number before the "×" designated how much faster than normal the particular trick mode is. The normal playback stream will include audio as well. In the alternative approach described with regard to FIG. 13, a new client application can be stored in memory 910 of set-top box 158, and can select the appropriate file for viewing depending on whether a user wants normal play or one of the available trick modes. Timing can be based on the longest file. Inventive techniques, such as those shown in FIGS. 12 and 13, can be employed regardless of how the trick modes are created.

One exemplary source of hardware components that could be modified to implement techniques of the invention is Tandberg Television Ltd. of Southampton, England. For example, a Tandberg MediaPoint™ asset management system could be modified to perform the functions of staging processor 109 and related components of head end 105.

Techniques exemplary of aspects of the invention have been described within the context of a cable television system 100, which can implement NDVR functionality, or which may have one or more set-top boxes 158 with DVR capability This example is not meant to be limiting. In general terms, inventive techniques are applicable to propagation of audio-visual assets with encapsulated trick modes, in a variety of environments where this may be advantageous, such as video-on-demand (not necessarily limited to DVR/NDVR functionality).

Attention should now be given to FIG. 14, which is similar to FIG. 1 but shows certain possible approaches which may be used in some instances of the present invention. Elements in FIG. 14 similar to those in FIG. 1 have received the same reference character incremented by thirteen hundred, and will not be described again except to the extent needed to clarify any substantial differences from FIG. 1. In FIG. 14, a satellite 1474 receives signals from a satellite company's uplink facility. Satellite 1474 is in communication with head end 1405 via link 1476; in the example shown, the link is to "catcher" 1472 of head end 1405. Thus, in addition to the manner of delivering tick modes described above, in the system depicted in FIG. 14, an asset may be pre-encoded by an encoding house. Such a house could package the asset together with trick mode file(s) and poster art, for example. The encoding house could deliver, for example, the movie or other program, poster art, meta data, a preview of the movie or other program, and an appropriate trick mode file. The materials could then be "pitched" over the satellite link as, for example, a large zip file, and once within head end 1405 could be propagated via catcher 1472 to cache manager 1411 for use by VOD server (media processor) 1419. The material sent in this fashion may include trick modes in the zip file, to be combined later for streaming as described herein, or may already be integrated for streaming. Processing can be, for example, within the encoding house or within the satellite company's uplink facility.

In another approach, also illustrated in FIG. 14, encoding can be done locally in an MPEG encoder 1470 present in head end 1405. Encoder 1470 can create the trick mode file(s) and place them in the transport stream. Both alternate approaches described with regard to FIG. 14 axe intended to be encompassed by "streaming within a network" as used herein, including in the claims.

It will be appreciated that, viewed in another perspective, one or more aspects or embodiments of the invention may implement an advantageous method of providing trick modes in a video-on-demand system. The method can include the steps of obtaining a representation of an audiovisual asset; processing the representation to obtain at least one normal playback video elementary stream and at least one tick mode video elementary stream; and forming a transport stream from the at least one normal playback video elementary stream and the at least one trick mode video elementary stream. The at least one trick mode video elementary stream is encapsulated in the transport stream. Furthermore, the method can include streaming the transport stream within a network, and providing the trick modes based on the at least one trick mode video elementary stream encapsulated in the transport stream. The providing can include, for example, de-encapsulating the at least one trick mode video elementary stream, the de-encapsulating being performed by a video-on-demand server to obtain at least one tick mode file, and playing the trick mode file, from the video-on-demand server, at a set-top box, responsive to a trick mode request from a uses of the box (for example, as in FIG. 12). In another approach, the providing can include, for example, facilitating sending the transport stream to a set-top box, and, responsive to a trick mode request from a user of the box, decoding, with the box, the at least one trick mode video elementary stream instead of the at least one normal playback video elementary stream (for example, as in FIG. 13).

Figure 15:
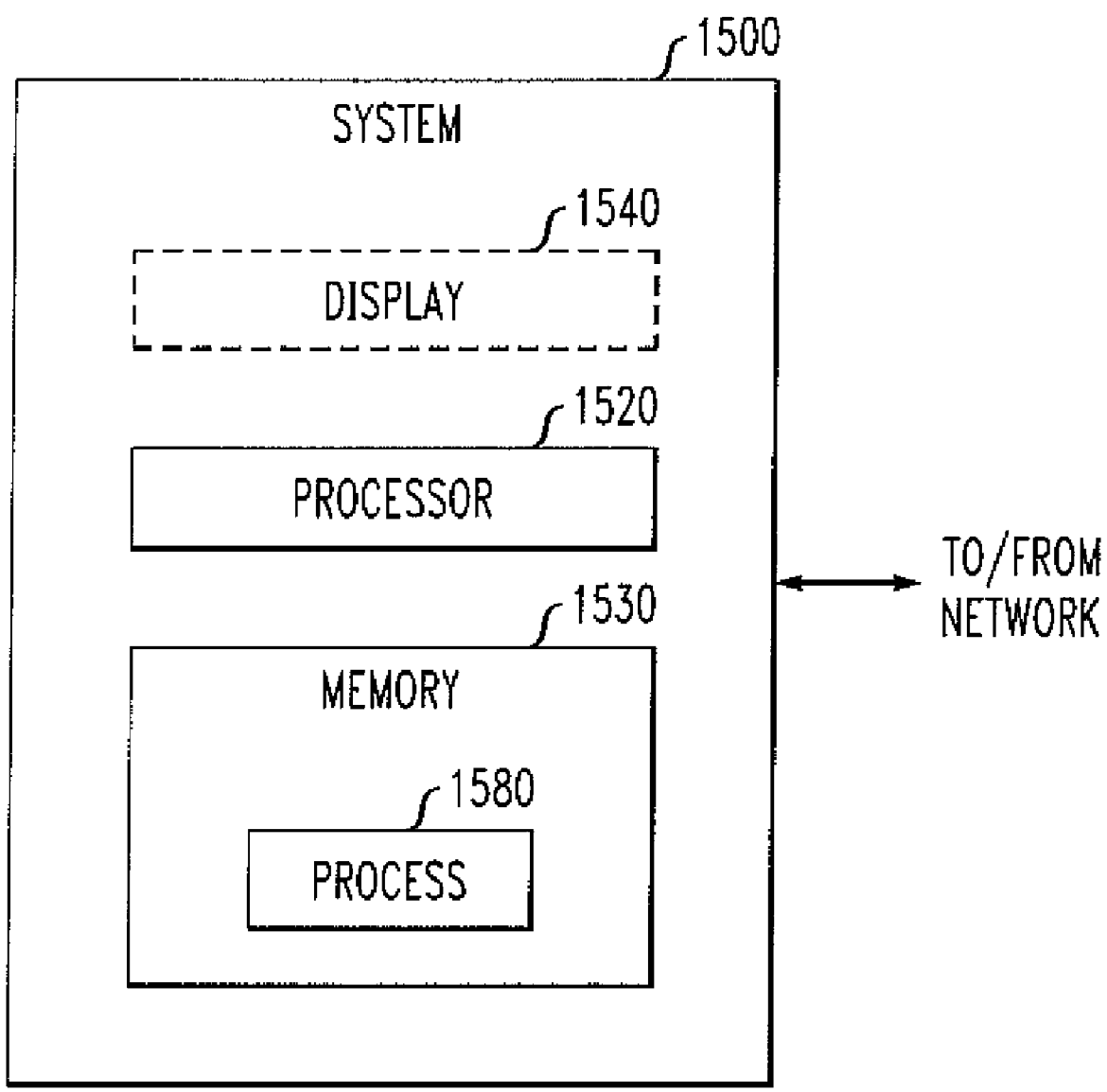
FIG. 15 is a block diagram of a computer system useful in connection with one or more aspects of the invention.

The invention can employ hardware and/or software aspects. Software includes but is not limited to firmware, resident software, microcode, etc. An exemplary embodiment of an inventive apparatus can include a memory and at least one processor coupled to the memory. The processor can be operative to facilitate performance of one or more of the method steps described herein. In another aspect, the apparatus can comprise means for performing the various method steps. The means can include one or more hardware modules, one or more software modules, or a mixture of one or more software modules and one or more hardware modules (appropriate interconnections via bus, network, and the like can also be included). One or more method steps of the present invention can be implemented in the form of an article of manufacture comprising a machine readable medium that contains one or more programs that when executed implement such step or steps. FIG. 15 is a block diagram of a system 1500 that can implement part or all of one or more aspects or processes of the present invention, processor 1520 of which is representative of processors 109, 119, 905, 1409, 1419, 1470, 1472, at a satellite uplink facility, and so on. In one or more embodiments, inventive steps are carried out carried out by one or more of processors 109, 119, and 905, in conjunction with one or more interconnecting network(s). As shown in FIG. 15, memory 1530 configures the processor 1520 to implement one or more aspects of the methods, steps, and functions disclosed herein (collectively, shown as process 1580 in FIG. 15). The memory 1530 could be distributed or local and the processor 1520 could be distributed or singular. The memory 1530 could be implemented as an electrical, magnetic or optical memory, or any combination of these or other types of storage devices (memory 1530 could be managed, in whole or part, by managers 111, 113). It should be noted that if distributed processors are employed, each distributed processor that makes up processor 1520 generally contains its own addressable memory space. It should also be noted that some or all of computer system 1500 can be incorporated into an application-specific or general-use integrated circuit. For example, one or more method steps could be implemented in hardware in an ASIC rather than using firmware. Display 1540 is representative of a variety of possible input/output devices.

System and Article of Manufacture Details

As is known in the are part or all of one or more aspects of the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. Such methods, steps, and functions can be carried out, e.g., by processing capability on elements 109, 119, 905, 1409, 1419, 1470, 1472, at a satellite uplink facility, and so on, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the present invention can make use of computer technology with appropriate instructions to implement method steps described herein.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of propagating an audiovisual asset, said method comprising the steps of:
    obtaining a representation of said audiovisual asset;
    processing said representation of said audiovisual asset to obtain at least one normal playback video elementary stream of said audiovisual asset and at least one trick mode video elementary stream of said audiovisual asset;
    forming a single program transport stream from said at least one normal playback video elementary stream of said audiovisual asset and said at least one trick mode video elementary stream of said audiovisual asset by multiplexing said at least one normal playback video elementary stream and said at least one trick mode video elementary stream together into a designated frequency band, said at least one trick mode video elementary stream of said audiovisual asset being encapsulated in said single program transport stream, said at least one normal playback video elementary stream having a normal playback video elementary stream packet identifier code, said at least one trick mode video elementary stream having a trick mode video elementary stream packet identifier code;
    facilitating streaming of said single program transport stream within a network; and
    using said normal playback video elementary stream packet identifier code and said trick mode video elementary stream packet identifier code to distinguish said at least one normal playback video elementary stream from said at least one trick mode video elementary stream.

2. The method of claim 1, wherein said processing step further comprises processing said representation to obtain at least one audio elementary stream of said audiovisual asset, and wherein said forming step further comprises forming said single program transport stream from said at least one audio elementary stream of said audiovisual asset.

3. The method of claim 2, wherein said representation comprises an analog representation and wherein said processing comprises digital video compression.

4. The method of claim 3, wherein said compression is performed in accordance with an MPEG-2 standard.

5. The method of claim 3, wherein said compression is performed in accordance with one of an MPEG-4, AVC, and H.264 standard.

6. The method of claim 2, wherein said representation comprises a digital representation.

7. The method of claim 6, wherein said digital representation comprises a digitally compressed representation.

8. The method of claim 7, wherein said digitally compressed representation is encoded at a variable bit rate and wherein said processing comprises at least re-encoding at a constant bit rate.

9. The method of claim 2, wherein said audiovisual asset is obtained by an acquisition/staging processor in a broadband communications system head end.

10. The method of claim 9, wherein said streaming comprises at least facilitating sending said single program transport stream to a video-on-demand server.

11. The method of claim 10, wherein said using of said normal playback video elementary stream packet identifier code and said trick mode video elementary stream packet identifier code to distinguish said at least one normal playback video elementary stream from said at least one trick mode video elementary stream comprises de-encapsulating said at least one trick mode video elementary stream of said audiovisual asset, said de-encapsulating being performed by said video-on-demand server.

12. The method of claim 11, wherein said at least one trick mode video elementary stream of said audiovisual asset comprises encapsulated trick mode files and wherein said de-encapsulating comprises tagging said files.

13. The method of claim 11, wherein said de-encapsulating is performed to obtain at least one trick mode file, further comprising the additional step of playing said trick mode file, from said video-on-demand server, at a set-top box, responsive to a trick mode request from a user of said box.

14. The method of claim 10, further comprising the additional step of facilitating sending said single program transport stream to a set-top box.

15. The method of claim 14, wherein said using of said normal playback video elementary stream packet identifier code and said trick mode video elementary stream packet identifier code to distinguish said at least one normal playback video elementary stream from said at least one trick mode video elementary stream comprises, responsive to a trick mode request from a user of said box, decoding, with said box, said at least one trick mode video elementary stream of said audiovisual asset instead of said at least one normal playback video elementary stream of said audiovisual asset.

16. The method of claim 2, wherein said step of forming said single program transport stream further comprises inserting at least one of an indication and a blank area in a region of said transport stream for which trick modes are to be suppressed.

17. The method of claim 2, wherein said at least one trick mode video stream of said audiovisual asset comprises a first trick mode video elementary stream of said audiovisual asset, said processing step further comprises processing to obtain at least a second trick mode video elementary stream of said audiovisual asset, and said second trick mode elementary stream of said audiovisual asset corresponds to a different playback speed than said first trick mode video elementary stream of said audiovisual asset.

18. The method of claim 2, wherein said streaming comprises at least streaming from a satellite to at least one terrestrial processor.

19. The method of claim 2, wherein said streaming comprises at least streaming over a broadband communications network.

20. The method of claim 2, wherein said streaming comprises at least streaming within a head end of a broadband communications network.

21. The method of claim 2, wherein at least one of said processing and forming steps is performed by an encoding house.

22. The method of claim 2, wherein at least one of said processing and forming steps is performed within an uplink facility of a satellite company.

23. The method of claim 2, wherein at least one of said processing and forming steps is performed by an MPEG encoder in a head end of a broadband communications network.

24. An apparatus for propagating an audiovisual asset, said apparatus comprising:
a memory; and
at least one processor coupled to said memory, said processor being operative to:
obtain a representation of said audiovisual asset;
process said representation of said audiovisual asset to obtain at least one normal playback video elementary stream of said audiovisual asset and at least one trick mode video elementary stream of said audiovisual asset;
form a single program transport stream from said at least one normal playback video elementary stream of said audiovisual asset and said at least one trick mode video elementary stream of said audiovisual asset by multiplexing said at least one normal playback video elementary stream and said at least one trick mode video elementary stream together into a designated frequency band, said at least one trick mode video elementary stream of said audiovisual asset being encapsulated in said single program transport stream, said at least one normal playback video elementary stream having a normal playback video elementary stream packet identifier code, said at least one trick mode video elementary stream having a trick mode video elementary stream packet identifier code; and
facilitate streaming of said single program transport stream within a network for subsequent distinguishing of said at least one normal playback video elementary stream from said at least one trick mode video elementary stream using said normal playback video elementary stream packet identifier code and said trick mode video elementary stream packet identifier code.

25. The apparatus of claim 24, wherein said processor is further operative to process said representation to obtain at least one audio elementary stream of said audiovisual asset, and to form said single program transport stream from said at least one audio elementary stream of said audiovisual asset.

26. The apparatus of claim 25, wherein said processor comprises an acquisition/staging processor in a broadband communications system head end.

27. The apparatus of claim 26, wherein said processor is operative to facilitate sending said single program transport stream to a video-on-demand server.

28. The apparatus of claim 26, further comprising a video-on-demand server, wherein said processor is operative to facilitate sending said transport stream to said video-on-demand server and wherein said video-on-demand server is configured to de-encapsulate said at least one trick mode video elementary stream of said audiovisual asset, using said normal playback video elementary stream packet identifier code and said trick mode video elementary stream packet identifier code to distinguish said at least one normal playback video elementary stream from said at least one trick mode video elementary stream.

29. The apparatus of claim 28, wherein said at least one trick mode video elementary, stream of said audiovisual asset comprises encapsulated trick mode files and wherein said video-on-demand server de-encapsulates said at least one trick mode video elementary stream by tagging said files.

30. The apparatus of claim 28, wherein said video-on-demand server is configured to de-encapsulate said at least one trick mode video elementary stream to obtain at least one trick mode file, and to facilitate playing said trick mode file, from said video-on-demand server, at a set-top box, responsive to a trick mode request from a user of said box.

31. The apparatus of claim 27, wherein said processor is operative to facilitate sending said single program transport stream to a set-top box.

32. The apparatus of claim 27, further comprising a set-top box, wherein said processor is operative to facilitate sending said single program transport stream to said set-top box, and wherein said set-top box is configured to decode said at least one trick mode video elementary stream of said audiovisual asset instead of said at least one normal playback video elementary stream of said audiovisual asset, responsive to a trick mode request from a user of said box, using said normal playback video elementary stream packet identifier code and said trick mode video elementary stream packet identifier code to distinguish said at least one normal playback video elementary stream from said at least one trick mode video elementary stream.

33. The apparatus of claim 25, wherein said processor is further operative to insert at least one of an indication and a blank area in a region of said single program transport stream for which trick modes are to be suppressed.

34. The apparatus of claim 25, wherein said at least one trick mode video stream of said audiovisual asset comprises a first trick mode video elementary stream of said audiovisual asset, and wherein said processor is further operative to process said representation to obtain at least a second trick mode video elementary stream of said audiovisual asset, and said second trick mode elementary stream of said audiovisual asset corresponds to a different playback speed than said first trick mode video elementary stream of said audiovisual asset.

35. The apparatus of claim 25, wherein said processor is further operative to facilitate streaming from a satellite to at least one terrestrial location.

36. The apparatus of claim 25, wherein said processor is further operative to facilitate streaming over a broadband communications network.

37. The apparatus of claim 25, wherein said processor is further operative to facilitate streaming within a head end of a broadband communications network.

38. The apparatus of claim 25, wherein said processor is located at an encoding house.

39. The apparatus of claim 25, wherein said processor is located at an uplink facility of a satellite company.

40. The apparatus of claim 25, wherein said processor comprises an MPEG encoder in a head end of a broadband communications network.

41. An apparatus for propagating an audiovisual asset, said apparatus comprising:
    means for obtaining a representation of said audiovisual asset;
    means for processing said representation of said audiovisual asset to obtain at least one normal playback video elementary stream of said audiovisual asset and at least one trick mode video elementary stream of said audiovisual asset;
    means for forming a single program transport stream from said at least one normal playback video elementary stream of said audiovisual asset and said at least one trick mode video elementary stream of said audiovisual asset by multiplexing said at least one normal playback video elementary stream and said at least one trick mode video elementary stream together into a designated frequency band, said at least one trick mode video elementary stream of said audiovisual asset being encapsulated in said single program transport stream, said at least one normal playback video elementary stream having a normal playback video elementary stream packet identifier code, said at least one trick mode video elementary stream having a trick mode video elementary stream packet identifier code;
    means for facilitating streaming of said single program transport stream within a network; and
    means for using said normal playback video elementary stream packet identifier code and said trick mode video elementary stream packet identifier code to distinguish said at least one normal playback video elementary stream from said at least one trick mode video elementary stream.

42. A method of providing trick modes in a video-on-demand system, said method comprising the steps of:
    obtaining a representation of an audiovisual asset;
    processing said representation of said audiovisual asset to obtain at least one normal playback video elementary stream of said audiovisual asset and at least one trick mode video elementary stream of said audiovisual asset;
    forming a single program transport stream from said at least one normal playback video elementary stream of said audiovisual asset and said at least one trick mode video elementary stream of said audiovisual asset by multiplexing said at least one normal playback video elementary stream and said at least one trick mode video elementary stream together into a designated frequency band, said at least one trick mode video elementary stream of said audiovisual asset being encapsulated in said single program transport stream, said at least one normal playback video elementary stream having a normal playback video elementary stream packet identifier code, said at least one trick mode video elementary stream having a trick mode video elementary stream packet identifier code
    streaming said single program transport stream within a network; and
    providing said trick modes based on said at least one trick mode video elementary stream of said audiovisual asset encapsulated in said single program transport stream, said normal playback video elementary stream packet identifier code and said trick mode video elementary stream packet identifier code being used to distinguish said at least one normal playback video elementary stream from said at least one trick mode video elementary stream.

43. The method of claim 42, wherein said providing comprises:
    de-encapsulating said at least one trick mode video elementary stream of said audiovisual asset, said de-encapsulating being performed by a video-on-demand server to obtain at least one trick mode file; and
    playing said trick mode file, from said video-on-demand server, at a set-top box, responsive to a trick mode request from a user of said box.

44. The method of claim 42, wherein said providing comprises:
    facilitating sending said single program transport stream to a set-top box; and
    responsive to a trick mode request from a user of said box, decoding, with said box, said at least one trick mode video elementary stream of said audiovisual asset instead of said at least one normal playback video elementary stream of said audiovisual asset.

* * * * *